United States Patent [19]

Gurmu et al.

[11] Patent Number: 5,297,049
[45] Date of Patent: * Mar. 22, 1994

[54] VEHICLE GUIDANCE SYSTEM

[76] Inventors: Hailemichael Gurmu, 507 Forrest St., #102, Oakland, Calif. 94618; Adamsu Gebre, Vreeland 19C, NE Amersfoort, Netherlands

[*] Notice: The portion of the term of this patent subsequent to Sep. 21, 2010 has been disclaimed.

[21] Appl. No.: 77,533

[22] Filed: Jun. 16, 1993

Related U.S. Application Data

[63] Continuation of Ser. No. 874,746, Apr. 27, 1992, Pat. No. 5,247,439, which is a continuation of Ser. No. 476,890, Feb. 8, 1990, Pat. No. 5,126,941, which is a continuation-in-part of Ser. No. 439,836, Nov. 8, 1982, abandoned.

[51] Int. Cl.$^5$ .............................................. G06F 15/50
[52] U.S. Cl. ................................ 364/436; 364/424.02; 340/989; 340/991; 340/992
[58] Field of Search ....................... 364/424.01, 424.02, 364/436-438; 342/454, 455; 340/989, 991, 992, 993, 905

[56] References Cited

U.S. PATENT DOCUMENTS

| | | | |
|---|---|---|---|
| 3,644,883 | 2/1972 | Borman et al. | 340/991 |
| 3,845,289 | 10/1974 | French | 364/444 |
| 3,849,636 | 11/1974 | Helms | 364/460 |
| 3,886,515 | 5/1975 | Cottin et al. | 340/994 |
| 3,899,671 | 8/1975 | Stover | 364/436 |
| 3,925,641 | 12/1975 | Kashio | 364/436 |
| 4,009,375 | 2/1977 | White et al. | 364/436 |
| 4,015,804 | 4/1977 | Dobler et al. | 364/436 |
| 4,023,753 | 5/1977 | Dobler | 364/436 |
| 4,083,003 | 4/1978 | Haemmig | 340/991 |
| 4,084,241 | 4/1978 | Tsumura | 364/460 |
| 4,301,506 | 11/1981 | Turco | 364/444 |
| 4,309,758 | 1/1982 | Halsall et al. | 364/449 |
| 4,350,970 | 9/1982 | Von Tomkewitsch | 364/436 |
| 4,402,050 | 8/1983 | Tagami et al. | 364/460 |
| 4,403,291 | 9/1983 | Von Tomkewitsch | 364/444 |
| 4,907,159 | 3/1990 | Mauge et al. | 364/436 |

OTHER PUBLICATIONS

Shuldiner, H. "Computerized Navigator For Your Car", Popular Science (Jun. 1985).
ETAK Product Brochure, "The World's First Automative Navigation System, The ETAK Navigator".
Zygmont, J. "Keeping Tabs on Cars and Trucks", High Technology (Sep. 1986).
Lasden, M. "Steer Maneuvers", Image (Apr. 27, 1986).
"Cars of the Future", Newsweek (Oct. 28, 1985).
Update "Vehicle Navigation System Takes Care of Business", High Technology (Aug. 1985).
Newscript "Satellite Navigation Being Developed for Cars," C & EN (Apr. 22, 1985).

Primary Examiner—Gary Chin
Attorney, Agent, or Firm—Cushman, Darby & Cushman

[57] ABSTRACT

A vehicle guidance system for guiding motor vehicles comprising a central traffic control system, a plurality of roadside equipment, and an on-board vehicle guidance and control system. The central traffic control system includes horizontal memory for storing horizontal coordinates and direction information of a locality, vertical memory for storing vertical coordinates and direction information of the locality transmitter for transmitting the horizontal and vertical information of the locality, and a system control unit for controlling the continuous transmission of the horizontal and vertical information of the locality The roadside equipment includes coordinates memory for storing the coordinates information of the roadside equipment, coordinates transmitter for transmitting the coordinates information of the roadside equipment to the vehicle, receiver for receiving destination information from the vehicle, and vehicle destination device for transmitting the coordinates information of the roadside equipment and the destination information of the vehicle to the central traffic control system. The on-board vehicle guidance and control system includes receiver for receiving the horizontal and vertical coordinates information of the locality traffic control system, vertical coordinates memory for storing the vertical coordinates information of the locality, horizontal coordinates memory for storing the horizontal coordinates information of the locality, an on-board system control unit for controlling the reception and storage of the horizontal and vertical coordinates information of the locality, display feed memory for storing route direction information for reaching the destination of the vehicle, and a display for displaying the route direction information.

19 Claims, 21 Drawing Sheets

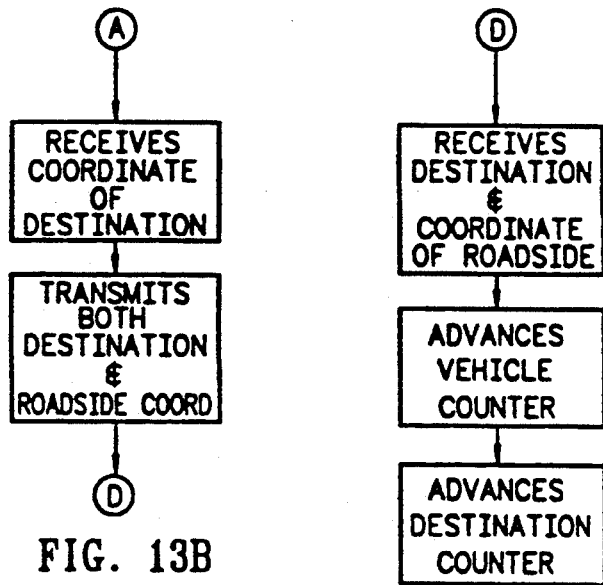
FIG. 13B
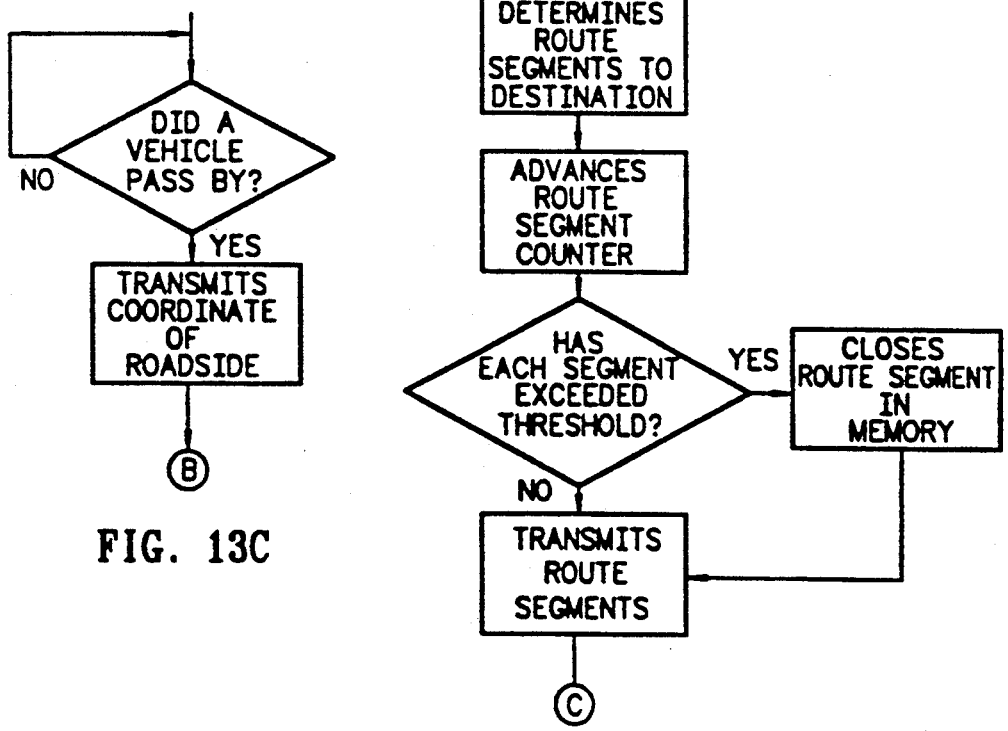
FIG. 13C
FIG. 13D

VEHICLE GUIDANCE SYSTEM

BACKGROUND OF THE INVENTION

Cross References To Related Patents and Patent Application

This application which is a continuation of Ser. No. 07/874,746 filed Apr. 27, 1992 (now U.S. Pat. No. 5,247,439), which is a continuation of Ser. No. 476,890 filed Feb. 8, 1990 (now U.S. Pat. No. 5,126,941), which is a continuation-in-part of our copending application Ser. No. 439,836 filed Nov. 8, 1982 now abandoned.

FIELD OF THE INVENTION

This invention relates to vehicle guidance systems and more particularly, to a vehicle guidance system that is capable of detecting traffic congestion and advising vehicles of alternatives.

DESCRIPTION OF THE ART

Vehicle guidance systems are known in the prior art. For example, Turco, U.S. Pat. No. 4,301,506, discloses a system of storing the route in an on-board computer such that maps or travel instructions are eliminated. Tagami et al. U.S. Pat. No. 4,402,050, discloses an apparatus for visually displaying the desired route of travel. In addition, the direction and distance of travel can determined by the system disclosed in Tsumura, U.S. Pat. No. 4,084,241. Moreover, Stover, U.S. Pat. No. 3,899,671, discloses the use of roadside transmitting stations to assist vehicles by transmitting information such as the desired route of travel. Further, von Tomkewitsch, U.S. Pat. No. 4,350,970, discloses a method for determining traffic condition and routing information to vehicles.

Each of these prior art references is deficient in some aspects. The systems disclosed in the Turco, Tagami et al., and Tsumura patents are incapable of detecting traffic congestion. Although the system disclosed in Stover may be capable of transmitting information to passing vehicles, it is incapable of detecting traffic. Last, the von Tomkewitsch system requires the cumbersome use of a plurality of roadside stations to compute route recommendations. In addition, since roadside stations are spaced at large distances, on-board vehicle equipment such as magnetic field probe must be utilized.

Vehicle Guidance System must be a dependable means for guiding a vehicle from any point to any other destination desired by the motorist.

In addition, the ideal vehicle guidance system must give instructions of directions with the effect that a driver is enabled to maneuver the vehicle from one point to any other desired destination even though he had no previous knowledge of the route.

The vehicle as we know it today has come a long way in relieving the driver from stress and make him as comfortable as possible during his journey. The one main factor remaining is that he must still find his way, and sometimes under difficult conditions. In cases where he is in an area which he has no prior knowledge, his difficulties increase. The cost in terms of stress time and money becomes high.

It is also firmly established that up to now there has not been any direct communication between the motorist on the road and the traffic department of a city. This has made it difficult for a Central Traffic Department to accurately and in good time predict the areas of possible congestion in order to advise alternative routes that can avoid such areas. It is estimated that on the average the motorist wastes 8% (eight percent) more fuel either in the process of finding his way or due to a traffic jam.

SUMMARY OF THE INVENTION

Disclosure of the Invention

In view of the prior art, it is a major object of the present invention to provide a vehicle guidance system that is capable of detecting traffic congestion and advising vehicles of alternative routes.

It is another object of the present invention to provide a vehicle guidance system that is capable of detecting route errors made by the vehicle.

It is a further object of the present invention to provide a vehicle guidance system that is capable of providing alternative routes after the vehicle had made route errors.

It is another object of the present invention to provide a vehicle guidance system having a central traffic control system for guiding vehicles, detecting traffic congestions, and providing alternative routes.

It is a still further object of the present invention to provide a vehicle guidance system having a roadside equipment that is capable of transmitting its coordinates and receiving and transmitting vehicle information.

It is another object of the present invention to provide a vehicle guidance system having an on-board vehicle guidance and control system that is capable of guiding the vehicle, detecting vehicles route errors, and providing alternative routes.

In order to accomplish the above and still further object, the present invention provides a vehicle guidance system that comprises a central traffic control system, a plurality of roadside equipment, and an on-board vehicle guidance and control system.

More particularly, the central traffic control system includes a horizontal memory for storing horizontal coordinates and direction of a locality, and a vertical memory for storing vertical coordinates and direction of the locality. Transmitter means is provided for transmitting the horizontal and vertical information on the locality. Last, a system control unit is provided for controlling the continuous transmission of the horizontal and vertical information for the locality.

The roadside equipment includes coordinate memory for storing the coordinates information of the roadside equipment. In addition, coordinates transmitter means is provided for transmitting the roadside coordinates information to the vehicle. Moreover, receiver means is provided for receiving the destination information from the vehicle. Further, vehicle destination transmitter means is provided for transmitting the coordinates information of the roadside equipment and the destination information of the vehicle to the central traffic control system.

The on-board vehicle guidance and control system includes receiver means for receiving the horizontal and vertical coordinates information of the locality. Vertical coordinates memory and horizontal coordinates memory are provided for storing the vertical coordinates information of the locality and the horizontal coordinates information of the locality, respectively. An on-board system control unit is provided for controlling the reception and storage of the horizontal and vertical coordinates information of the locality. Moreover, a display feed memory is provided for storing the route direction information for reaching the destination of the vehicle. Further, display means is provided for displaying the route direction information.

One advantage of the present invention is that the vehicle guidance system is capable of detecting traffic congestion and providing vehicles with alternative routes.

Another advantage of the present invention is that the vehicle guidance system is capable of detecting route errors made by the vehicle.

A further advantage of the present invention is that the vehicle guidance system is capable of providing alternative routes after the vehicle had made route errors.

Another advantage of the present invention is that the vehicle guidance system includes a central traffic control system that is capable of guiding vehicles, detecting traffic congestions, and providing alternative routes.

A still further advantage of the present invention is that the vehicle guidance system includes roadside equipment that is capable of transmitting its coordinates and receiving and transmitting vehicle information.

Another advantage of the present invention is that the vehicle guidance system includes an on-board vehicle guidance and control system that is capable of guiding the vehicle, detecting vehicle route errors, and providing alternative routes.

Other objects, features, and advantages of the present invention will appear from the following detailed description of the best mode of a preferred embodiment taken together with the accompanying drawing.

BRIEF DESCRIPTION OF THE DRAWINGS

FIGS. 6A1-2 is a partial, detailed schematic of the central traffic control system of FIG. 5A;

FIGS. 13A-13D are flow diagrams of the operation of the vehicle guidance system of the present invention.

DETAILED DESCRIPTION OF THE PRESENTLY PREFERRED EXEMPLARY EMBODIMENTS

Figure 1:
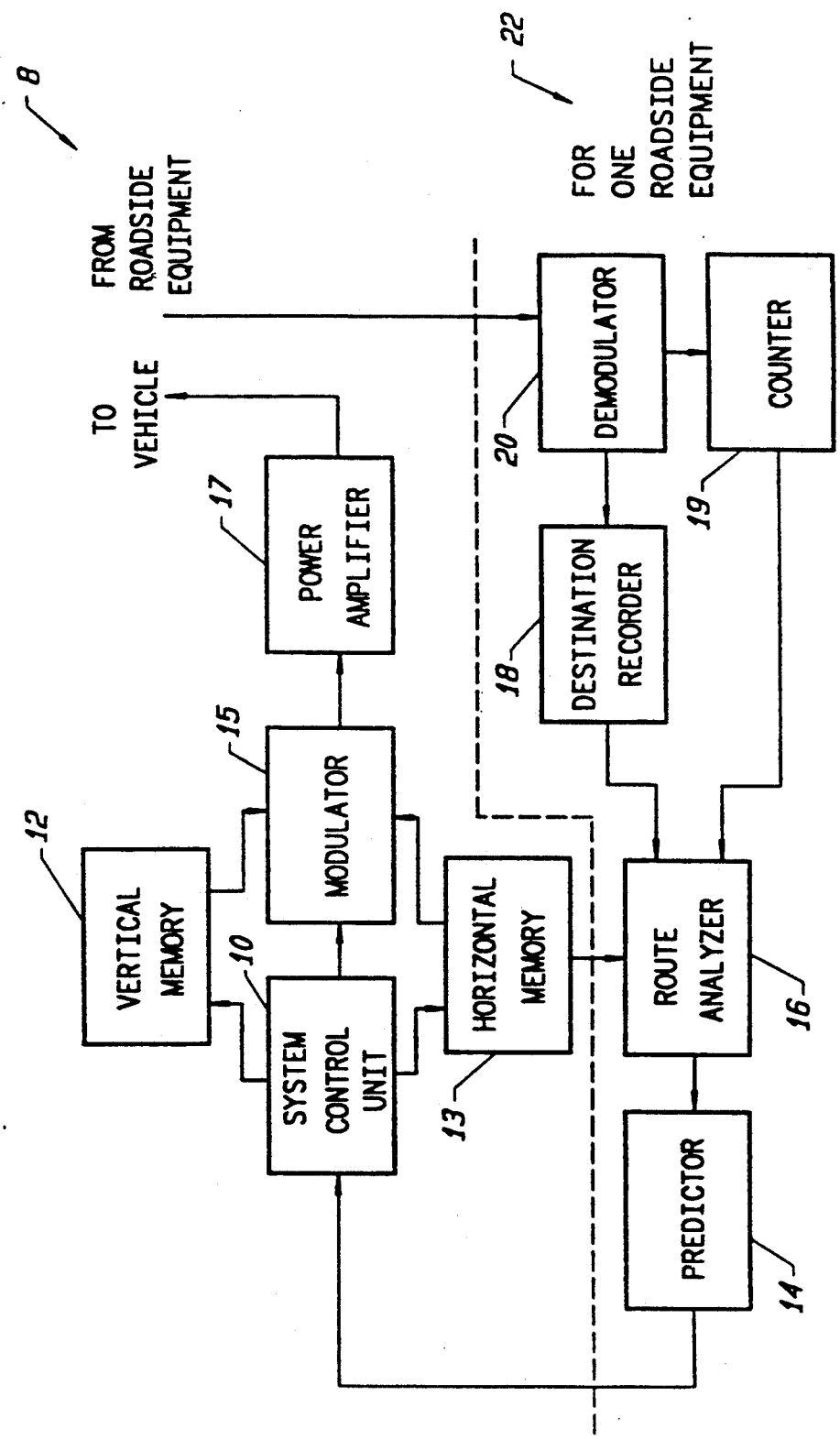
FIG. 1 is a block diagram of the central traffic control system of the vehicle guidance system of the present invention.

The vehicle guidance system according to the present invention comprises three separate subsystems. Referring to FIG. 1, there is shown the first subsystem, a central traffic control system, generally designated 8. Central traffic control system s comprises system control unit 10, vertical memory tank 12, horizontal memory tank 13, predictor 14, output modulator 15, route analyzer 16, output power amplifier 17, destination recorder 18, counter 19, and input demodulator 20.

Figure 4:
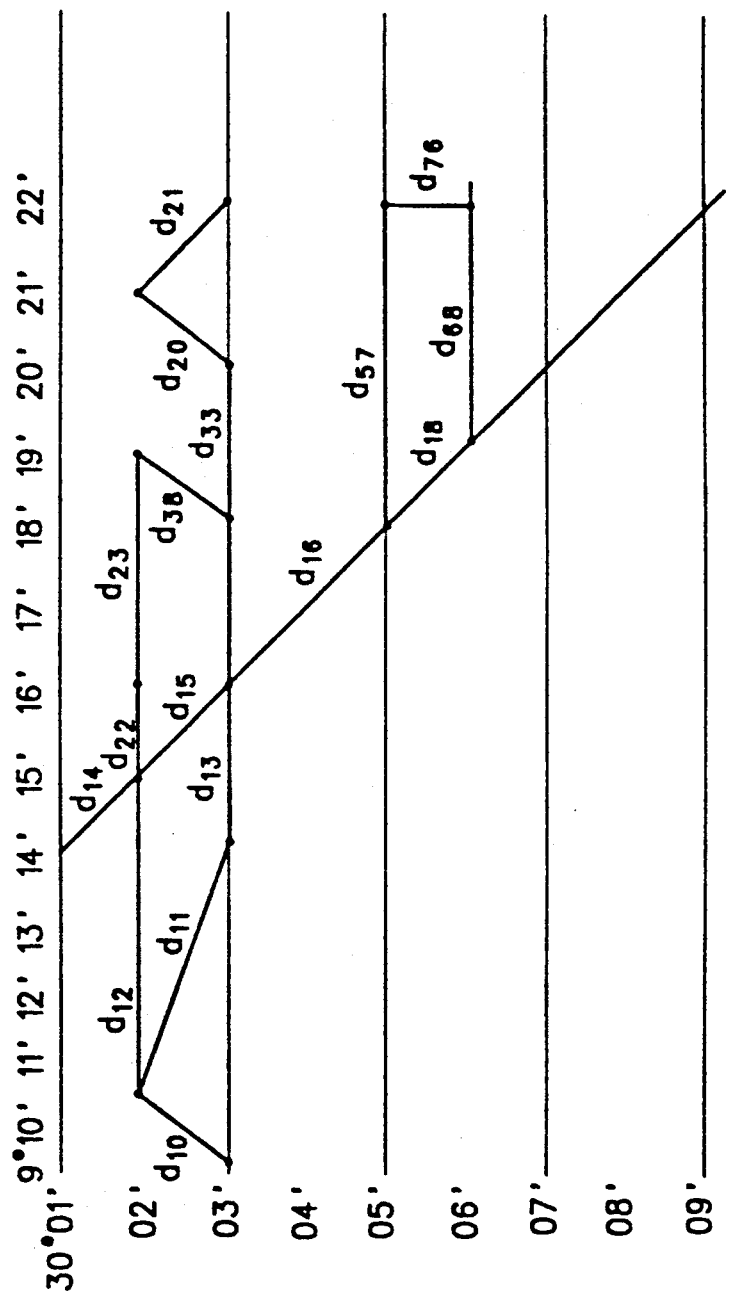
FIG. 4 is a diagrammatic representation of the operation of the vehicle guidance system of the present invention.

In particular, vertical and horizontal memory tanks 12 and 13 contain distances between any two points of decision in a locality such as a city. Various locations in such a city are designated by a coordinate system. These coordinates generally represent points of decision such as intersections of roads. For example, as best shown in FIG. 4, coordinates may be arbitrarily assigned to a section of a city. In addition, the lines emanating from each coordinate, each representing the distance to an adjacent point of decision, are categorized as either horizontal lines or vertical lines. Such categorization, whether as horizontal or vertical, is based on the relative comparison of one line with the imaginary orthogonal lines which emanate from the same point of decision. In FIG. 4, distance d12 is categorized as horizontal and d11 vertical. This categorization is based on the comparison that if the angle between the line of interest, e.g., d12, and an imaginary horizontal line emanating from the coordinate (30.02, 9.11) is less than 45 degrees, then the line of interest is categorized as a horizontal line. Similarly, if the angle between the line of interest, e.g., d11, and the imaginary horizontal line is equal to or greater than 45 degrees, then that line of interest is categorized as a vertical line. Similarly, d12 is categorized as horizontal and d15 vertical.

Figure 5A:
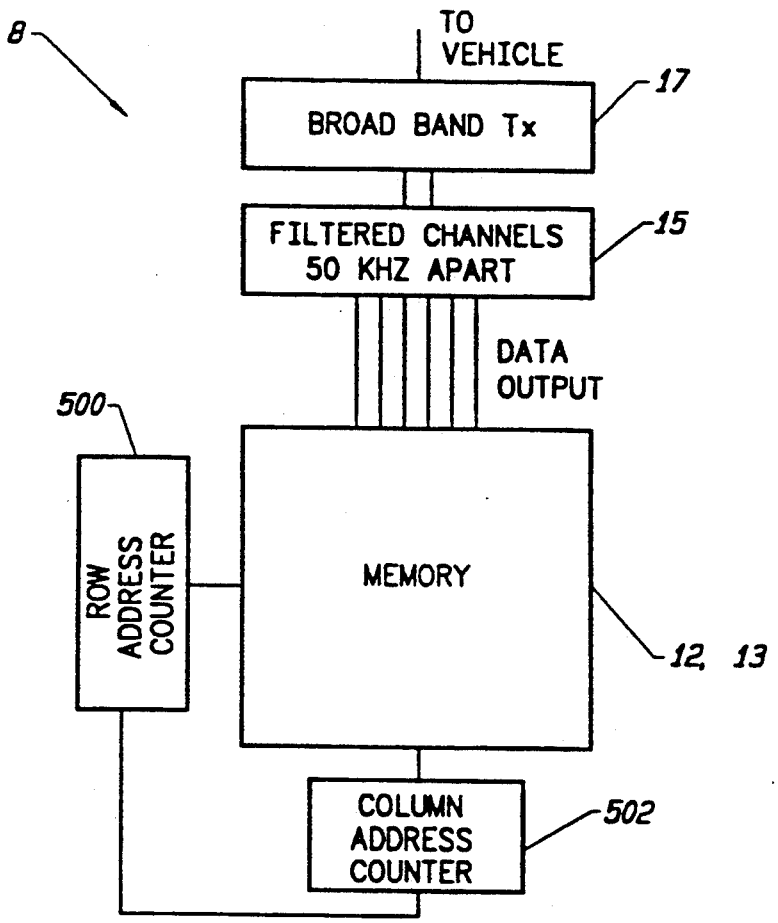
FIG. 5A is a partial, detailed block diagram of the central traffic control system of FIG. I.

More particularly, although vertical and horizontal memory 12 and 13 are illustrated as separate elements, they nonetheless could be described as a single entity and are illustrated as a single entity in FIG. 5A. Whether viewing vertical and horizontal memory 12 and 13 as a single or multiple entity is within the knowledge of one skilled in the art. As best shown in FIG. 4, each point of decision should have a plurality of entries, e.g., from a minimum of three to a maximum of eight in the preferred embodiment. The maximum number naturally may be expanded if warranted. At coordinate (30.02, 9.15), for example, there are four bearings or directions emanating from that coordinate. The designation of a particular bearing is the result of a comparison of that particular direction with true north or zero degree. For example, direction d22 is 90 degrees from true north; d15 135 degrees; d12 270 degrees; and d14

315 degrees. These bearings are determined in a clockwise manner from bearing zero degree.

Figure 5B:
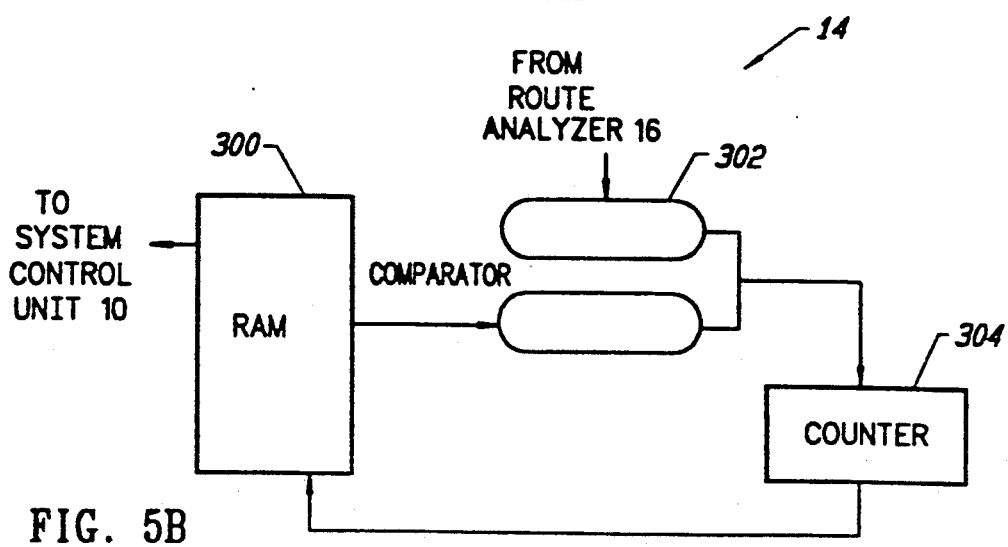
FIG. 5B is a partial, detailed schematic of the predictor of the central traffic control system of FIG. 5A.
Figures 1, 6A:
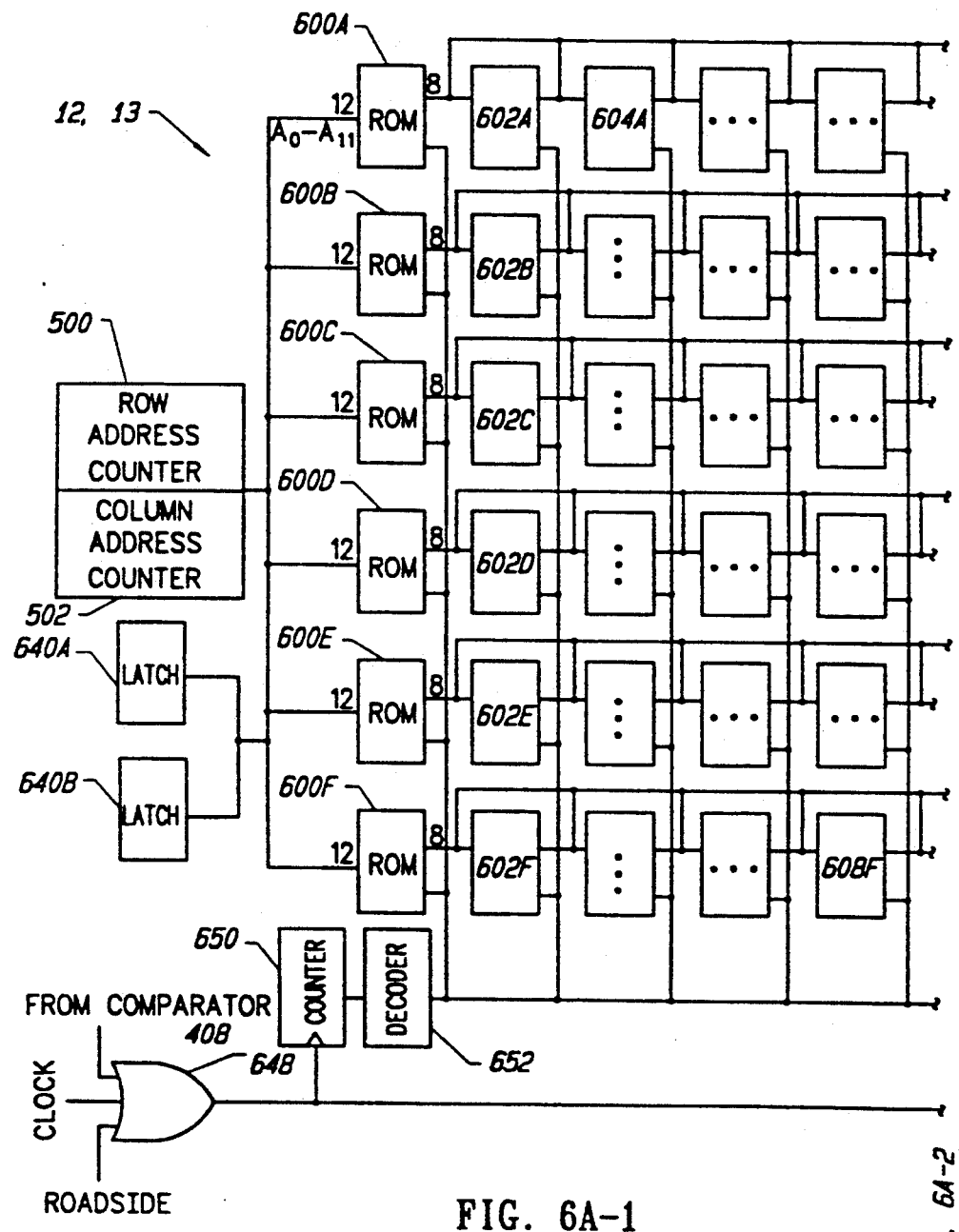
Figures 2, 6A:
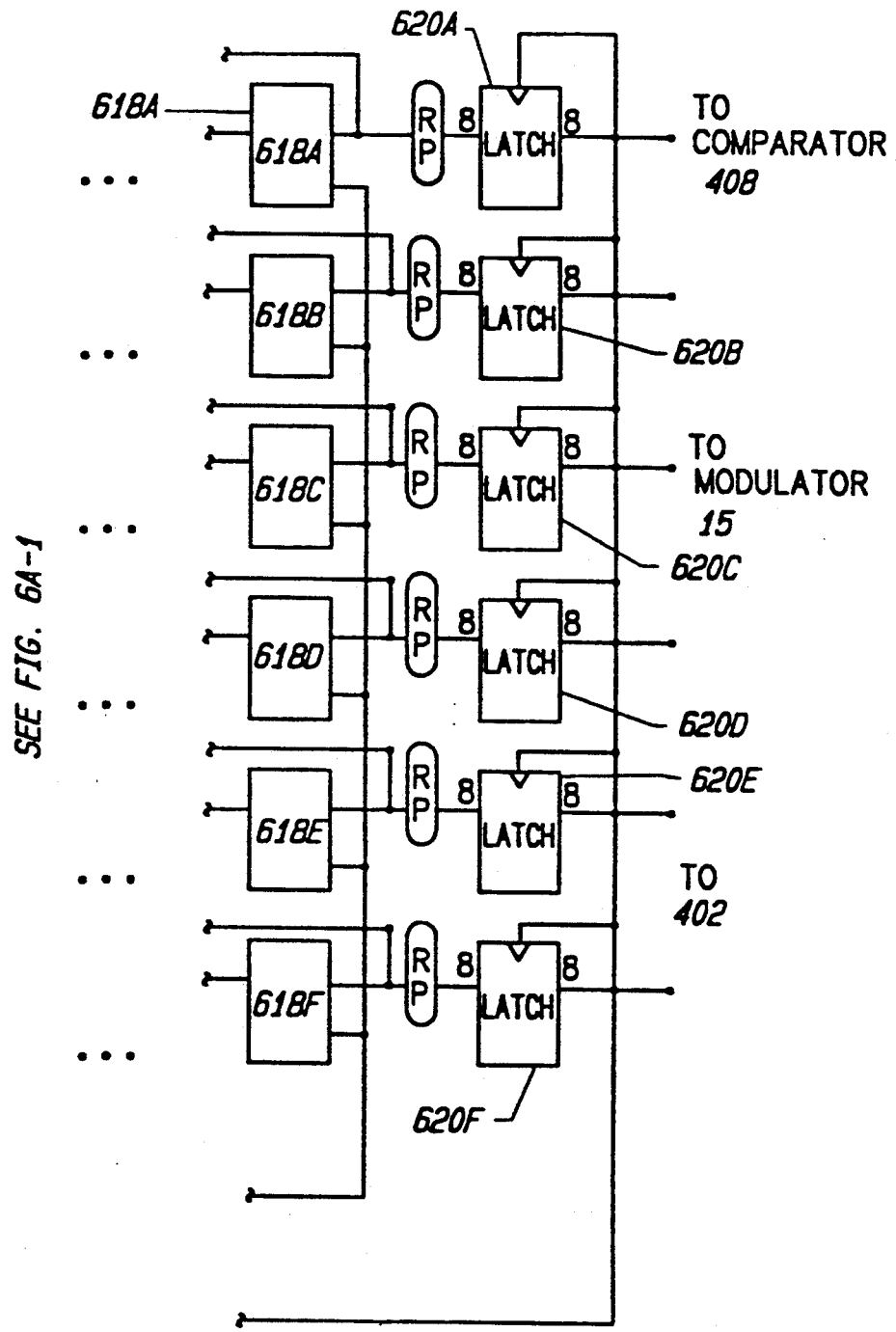

Thus determined, these bearings are stored in memory 12, 13. As best shown in FIG. 6A, memory 12, 13 comprises a plurality of memory cells 600A through 600F, 602A through 602F, etc. Each of these central memory cells is a conventional 4K read only memory (ROM) device. In addition, as illustrated in both FIGS. 5 and 6, system control unit 10 includes a conventional row address counter 500 and a conventional column address counter 502. Accordingly, memory cell 600A, at a particular address location, the bearing for d22, i.e., 90 degrees. The next memory cell, cell 600B, is capable of storing information such as gas station, restaurant, etc. for segment d22. The next two memory cells, cells 600C and 600D store the distance to the next point of decision, e.g., 300 meters to coordinate (30.02, 9.16). Last, the remaining memory cells, cells 600E and 600F, store the address for the coordinate of that next point of decision. In this fashion, the next bearing and concomitant data are stored in memory cells 602A through 602F. Thus, all bearings emanating from all points of decision are stored in memory 12, 13.

Further, all of the data for all of the bearings emanating from a particular point of decision are accessed through the same address. To transmit each bearing and its associated data in an orderly fashion, as described below, a conventional counter 650 and a conventional decoder 652 are provided. Counter 650, receiving clock pulses, generates a periodic signal that causes decoder 652 to enable the transmission of a bearing and its associated data, e.g., the memory contents at a particular address for cells 600A–600F. The outputted data are latched into a plurality of conventional latches 620A through 620F. The outputs of latches 620A–620F are in turn forwarded to modulator 15 for transmission. As decoder 652 enables the next set of cells, ROM's 602A–602F, memory contents of the same particular address are outputted to latches 620A–620F. An example of the memory contents is as follows:

| address | street name | bearing | dist. | next coord. address |
|---|---|---|---|---|
| 480 | 08 | 60 | 18 | 218.79 |
|  |  | 25 | 75 | 220.75 |
|  |  | 4E | 32 | 182.120 |
| 500 | 2F | 05 | 145 | 197.84 |
|  |  | 06 | 142 | 201.99 |
|  |  | 07 | 45 | 208.87 |
|  |  | 08 | 105 | 227.57 | where the street name and bearing are hexadecimal numerals, and the distance in meters.

In the alternative, the coordinates of a particular point of decision and its associated line, representing the direction and distance to another point of decision, are stored in horizontal memory 12 in one embodiment if the particular line is categorized as horizontal. Vertical memory 13 contains similar coordinates and vertical lines. For simplicity of transmission and reception, as discussed below, a city could be divided into four sections such as A, B, C, D. System control unit 10 is adapted to perform two functions. First, it is capable of transmitting continuously the memory contents of both horizontal memory 12 and vertical memory 13.

Control Unit 10 initiates the transmission of a signal that identifies the city and the section within the city, followed by the coordinates of the point of decision. These signals are then followed by the vertical and horizontal distances connected with the coordinates of that particular point of decision.

Once all the information stored in horizontal memory 12 and vertical memory 13 are transmitted, control unit 10 automatically repeats the transmission of these information from the beginning of each memory. A transmission of signals from control unit 10 contains information regarding the locality such as a city, information regarding the particular section of a city, such as section A, and the coordinates and distances between points of decision within that section. The information regarding the other sections are also sequentially transmitted. Once all the information in memory 12, 13 are outputted, control unit 10 automatically recycles or rotates back to the beginning of memory and continuously outputs the information.

The information being transmitted are first modulated by output modulator 15. Eight different frequencies are generated by Modulator 15 to effectuate a conventional multi-frequency modulated wave signal, as best shown in FIG. 5A. In the preferred embodiment, the carrier frequency transmitted by central system 8 is approximately 10 MHz. Using the conventional multi-frequency technique, a conventional, internal multiplexer is used to generate a multiplexed signal that represents a bit of the data from memory 12, 13. In addition, the multiplexed signal includes information, in a conventional manner, regarding the city, the section, etc. Thus, central system 8 first transmits an identifier such as city or section before transmitting all of the bearings located in such a city or section. This technique, as described below, permits the vehicle to receive the most relevant data, e.g., the bearings nearest its present location, rather than store the vast of information for a particularly large locality.

Output power amplifier 17 then amplifies the multiplexed signal before transmission. Transmission is effected in a conventional rotary manner, i.e., output power amplifier 17 amplifies continuously the output signals from control unit 10 which is cyclically transmitting the contents of memories 12 and 13.

As stated previously, the outputted signals of power amplifier 17 contain the coordinates and distances of each point of decision within each section. These information are transmitted until all the sections in the city are covered. Control unit 10 then goes back to the first section and repeats the transmission.

Control unit 10 also performs a second function. It is capable of altering the coordinates contained in memory 12, 13 such that any detected traffic blockage, as discussed below, could be avoided. Or, any change in the pre-planned route is quickly detected and the coordinates in memory 12, 13 altered accordingly. Such alterations are necessary to guide the wandering vehicle, as discussed below. For example, if the segment d22 has been determined by predictor 14, as described below, to be congested, system control unit 10 alters the bearing for d22 during its transmission from memory 12, 13; altering the bearing from its Value in memory 12, 13 to zero. Thus altered, that segment has effectively been eliminated as a possible route to travel on when vehicle guidance and control system 29 is determining into which segment to enter. These modifications are then transmitted in the continuous manner as described previously.

Another important feature of central traffic control system 8 is its capacity to receive and register the movement of each vehicle equipped with the Vehicle Guidance System as described below. This feature employs demodulator 20 which receives the code representing the point of entry/exit and forwards the information to counter 19 and destination recorder 18, respectively.

Demodulator 20 is tuned to the carrier frequency of roadside equipment transmitters, as described below. The information from roadside equipment contains its horizontal and vertical coordinate and the destination of a vehicle that had just passed that particular equipment. Counter 19, a conventional counter, records the number of vehicles passing a particular roadside equipment. Destination recorder 18 records the destination of that particular vehicle, i.e., the coordinate of that vehicle's destination. In this manner not only the number of vehicles entering or leaving a city or a section is recorded but also the destination of each. Based on this information, Route Analyzer 16 and Predictor 14 compute the possible congestion on various roads. If an exchange of such information is effected between cities then it is possible to accurately determine the number of vehicles on the freeways connecting them.

More particularly, information from destination recorder 18 and counter 19 are inputted into route analyzer 16. Analyzer 16 is adapted to present the destination of the particular vehicle. Predictor 14 in turn stores the destination of all vehicles and detects whether congestion will occur on a particular road by counting the actual number of vehicles heading toward a particular destination on a particular route. As best shown in FIG. 1, central system 8 has a plurality of equipment group 22 each of which includes a demodulator 20, counter 19, destination recorder 18, route analyzer 16, and predictor 14. Thus, each equipment group 22 is dedicated to a particular roadside equipment 40.

Figure 6B:
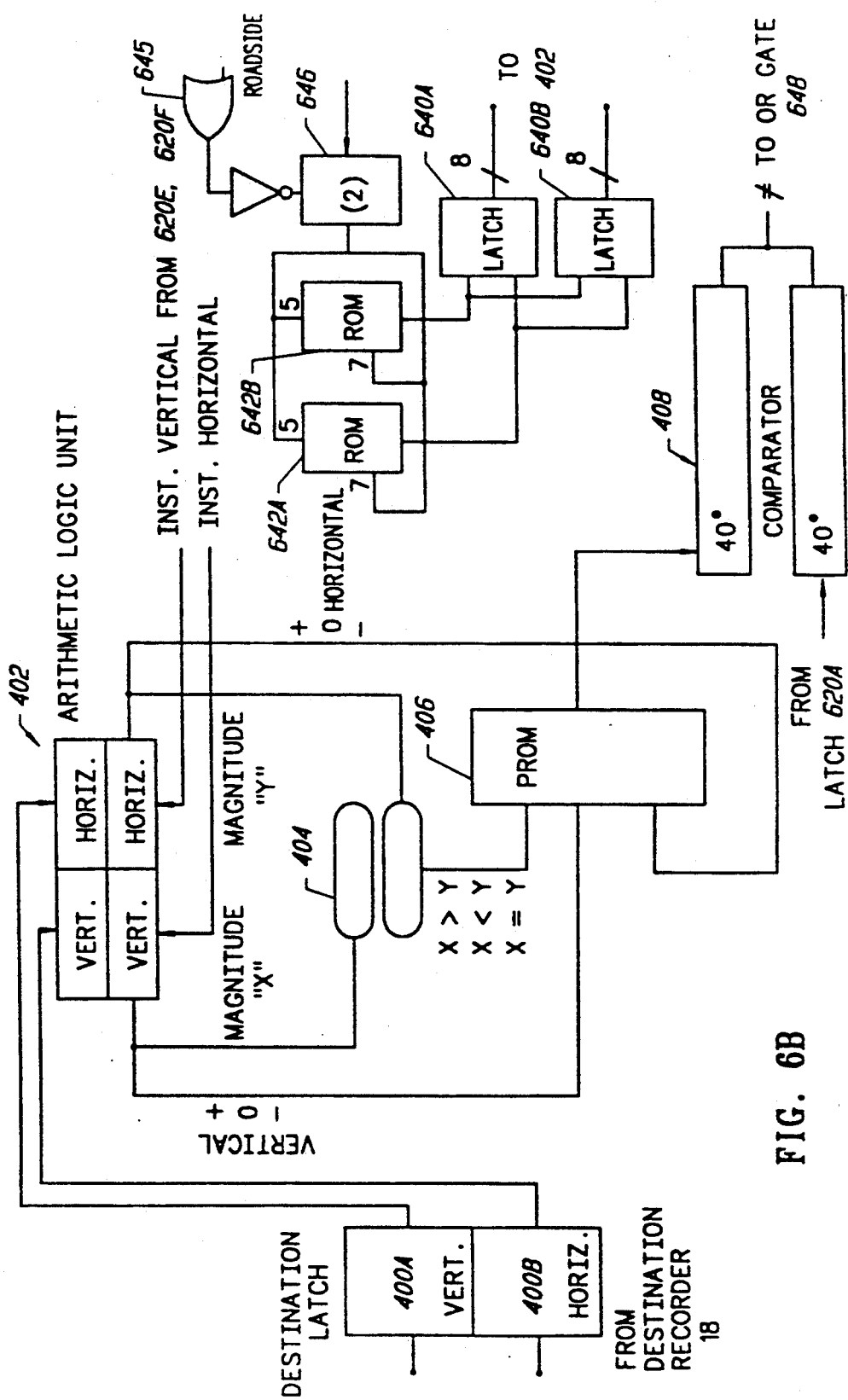
FIG. 6B is a partial, detailed schematic of the route analyzer of the central traffic control system of FIG. 5A.

In particular, route analyzer 16 performs its functions in a fashion similar to that of system control unit 35 of vehicle guidance and control system 29, as described below. As best shown in FIG. 6B, the instantaneous position of the vehicle is known, that position being the coordinate of the particular roadside equipment 40 that had just transmitted its coordinate and the destination of the passing vehicle. The address of the instantaneous coordinate first enters a pair of current drivers 646 which in turn addresses a pair of conventional read only memory (ROM) devices 642A and 642B which contain address of the coordinate. The address of the coordinate is then latched into latches 640A and 640B. In addition, the destination of the vehicle is forwarded by destination recorder 18 and latched in latches 400A and 400B.

An arithmetic logic unit 402 is provided in which the destination coordinate address is positioned on one side of unit 402 and the instantaneous coordinate address from roadside equipment 40 is positioned on the other side. These two figures are then compared by a comparator 404 to determine the relative value between them, e.g., whether one is greater or less than the other, or whether they are equal.

Figures 11A, 11B:
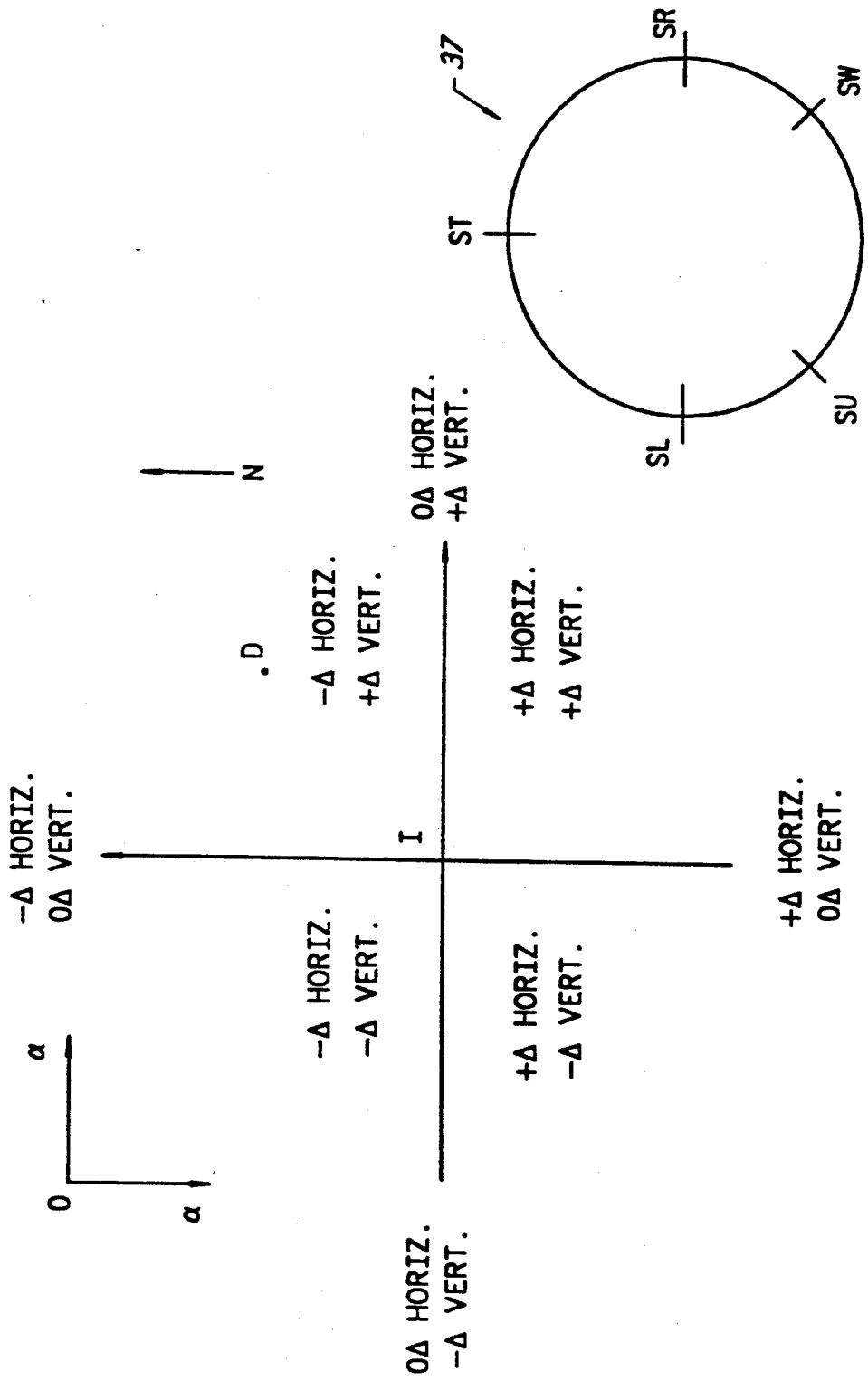
FIG. 11A is a diagrammatic representation of the operation of the system control unit of the on-board vehicle guidance and control system of FIG. 10.
FIG. 11B is a diagrammatic view of the direction sensors of the vehicle guidance and control system of FIG. 7.

As best shown in FIG. 11A, the magnitude of the difference between the two coordinates and their relative value are derived in light of the following coordinate system. Two imaginary orthogonal lines create four quadrants. In the horizontal direction, values increase in the rightward direction, i.e., west to each. Similarly, values increase in the downward vertical direction, i.e., north to south. If one is presently located at the zero intersection or instantaneous location "I" and selects a destination point "D" that is located in the first or upper right quadrant, subtracting the coordinate of "D" from the instantaneous coordinate "I" would result in certain magnitudes, as described previously. In addition, the magnitude of the resultant horizontal ($\Delta h$) is a negative number and the resultant vertical ($\Delta v$) positive. Thus, a negative horizontal and a positive vertical denote the first quadrant. Similarly, the second or lower right quadrant has positive horizontal and vertical; the third positive horizontal and negative vertical; and fourth both negative.

In this fashion, the resultant horizontal and vertical direction are inputted into a conventional read only memory (ROM) device 406. The magnitudes of the subtraction are forwarded to comparator 404. In essence, these two magnitudes are the legs of a triangle such that tangent could be determined to be greater or less than 45 degrees, or equal to 45 degrees. The positive or negative directions and the tangents are forwarded to ROM 406. These values form a 9-bit digital word, for example:

| MAGNITUDE | | | HORIZONTAL | | | VERTICAL | | |
|---|---|---|---|---|---|---|---|---|
| X > Y | X < Y | X = Y | + | o | − | + | o | − |
| 1 | 0 | 0 | 0 | 0 | 1 | 1 | 0 | 0 |

This digital word is an address such that a predetermined bearing stored in ROM 406 at that address is outputted to a second comparator 408.

Each bearing having the address as that stored in counters 500 and 502 is compared at comparator 408. When a match is detected, that bearing and its associated data are already in latches 620A–620F. These data represent the first segment of a proposed route for the vehicle as conjectured by central system 8. The address of the coordinate of the next point of decision contained in cells 620E and 620F is forwarded to arithmetic logic unit 402. Although counters 500 and 502 and latches 620E and 620F are illustrated and described as separate devices, they may be the same devices. In this fashion, a plurality of connected bearings are selected by predictor 16.

For example, if a roadside equipment is positioned at coordinates (30.02, 9.11) and the destination coordinates of a vehicle are (30.02, 9.19), route analyzer 16 first subtracts the coordinates of the roadside equipment from those of the vehicle destination. In predicting this probable route, route analyzer 16 utilizes the data stored in memory 12 and 13 such as bearing, coordinates, etc., as described previously. Since the resultant distance contains a horizontal difference of 0 and a vertical difference of +8, route analyzer 16 selects segment d12. Using the other coordinates of d12 (30.02, 9.11) as the new reference point, route analyzer 16 compares these coordinates with destination (30.02, 9.19), and selects segment d22. D23 is then similarly selected to complete the selection of a series of route segments to enable the vehicle to reach its destination.

Last, each of the segments that constitute the predicted route is then compared with a conventional memory contained in predictor 14. As best shown in FIG. 5B, conventional random access memory device 300 contains a list of route segments, e.g., d22, d38, etc. A conventional comparator 302 is provided on side of which contains the segment from route analyzer 16 and the other side a segment from RAM 300. Once a comparison is made, a conventional counter 304 is activated so as to place a marker adjacent that segment in RAM 300. Predictor 14 periodically forwards the contents of RAM 300 to a comparable memory device in system control unit 10. Whenever the recorded amount for that segment has reached a predetermined amount, i.e., indicating potential congestion, system control unit 10 alters that particular bearing during the continuous transmission of the contents of memory 12, 13. System control unit 10, utilizing conventional technique, in essence, causes the vehicle to receive a zero value for that bearing. Such modification eliminates these congested segments as possible routes of travel. This ensures an even distribution of traffic.

Figure 2:
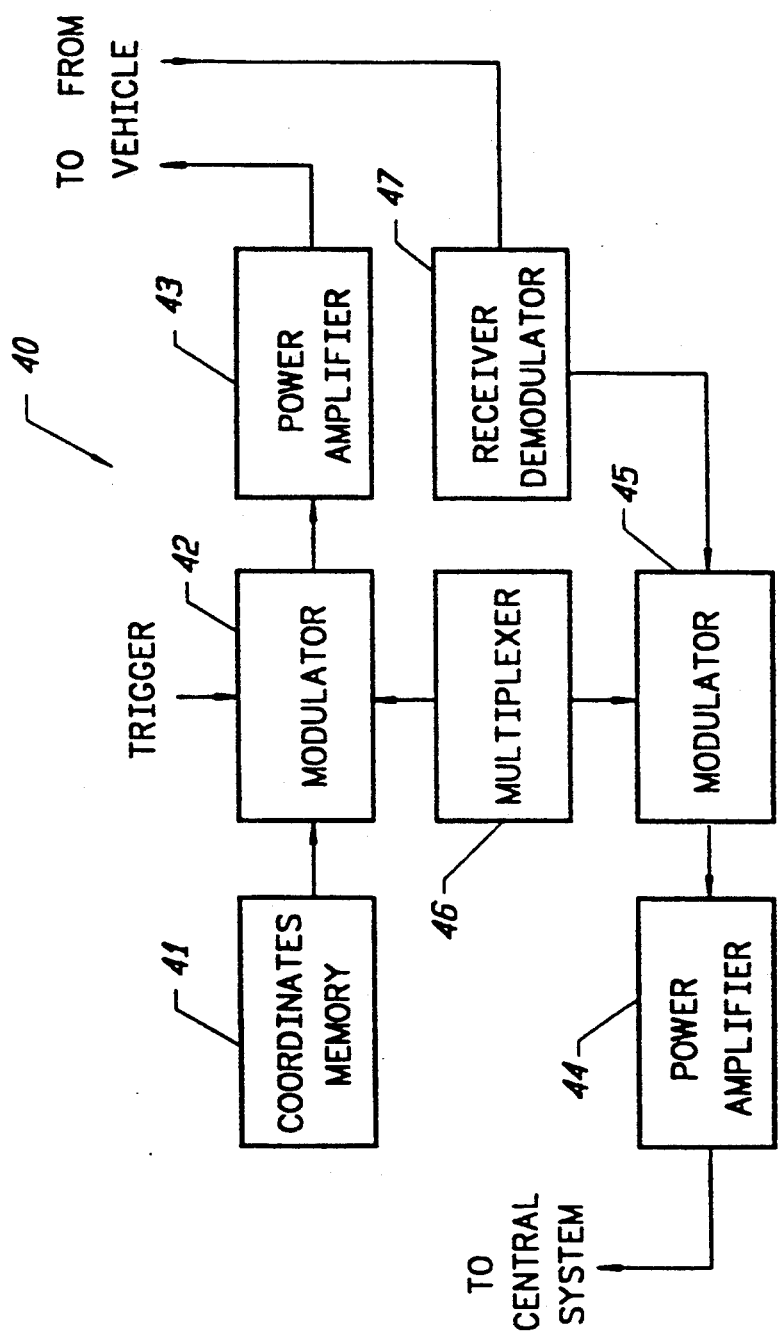
FIG. 2 is a block diagram of the roadside equipment of the vehicle guidance system of the present invention.

The second subsystem of the present invention, referring to FIG. 2 is a roadside equipment, generally designated 40. This equipment is placed at Entry/Exit of countries, cities, sections and at convenient positions along roadways. Its main purpose is to transmit to the equipment in the vehicle, as described below, its exact coordinates, receive the destination code from the vehicle and then retransmit it to Traffic Control Center system 8. Roadside equipment system 40 comprises coordinates memory 41, modulators 42, 45, power amplifiers 43, 44, multiplexer 46, and receiver demodulator 47.

Roadside equipment 40 also performs two functions, the first of which is to continuously transmit to passing vehicles its coordinates. Its coordinates, permanently stored in memory 41, are modulated by a carrier frequency in modulator 42. Memory 41, in the preferred embodiment, comprises eight vertical and horizontal thumbwheel switches such that the preset positions of the switches represent the coordinate of the particular roadside equipment. In addition, the passage of each vehicle triggers modulator 42 to enable the modulation of the roadside equipment coordinate contained in memory 41. The carrier frequency is produced by multiplexer 46 in a conventional fashion. The carrier frequency in the preferred embodiment is 12 MHz. Power amplifier 43 amplifies the signal before transmission. This condition is effected every time a vehicle crosses that point. The equipment in the vehicle receives these coordinates and transmits its own destination, not shown.

Roadside equipment 40 then performs its second function. Receiver demodulator 47, receiving the vehicle's coordinates and destination information, demodulates the information. This information along with the coordinates of roadside equipment 40 are then modulated by the carrier presented by multiplexer 46 in modulator 45. The signal is amplified in power amplifier 44 before transmission to the Traffic Control Office system 8.

Figure 3:
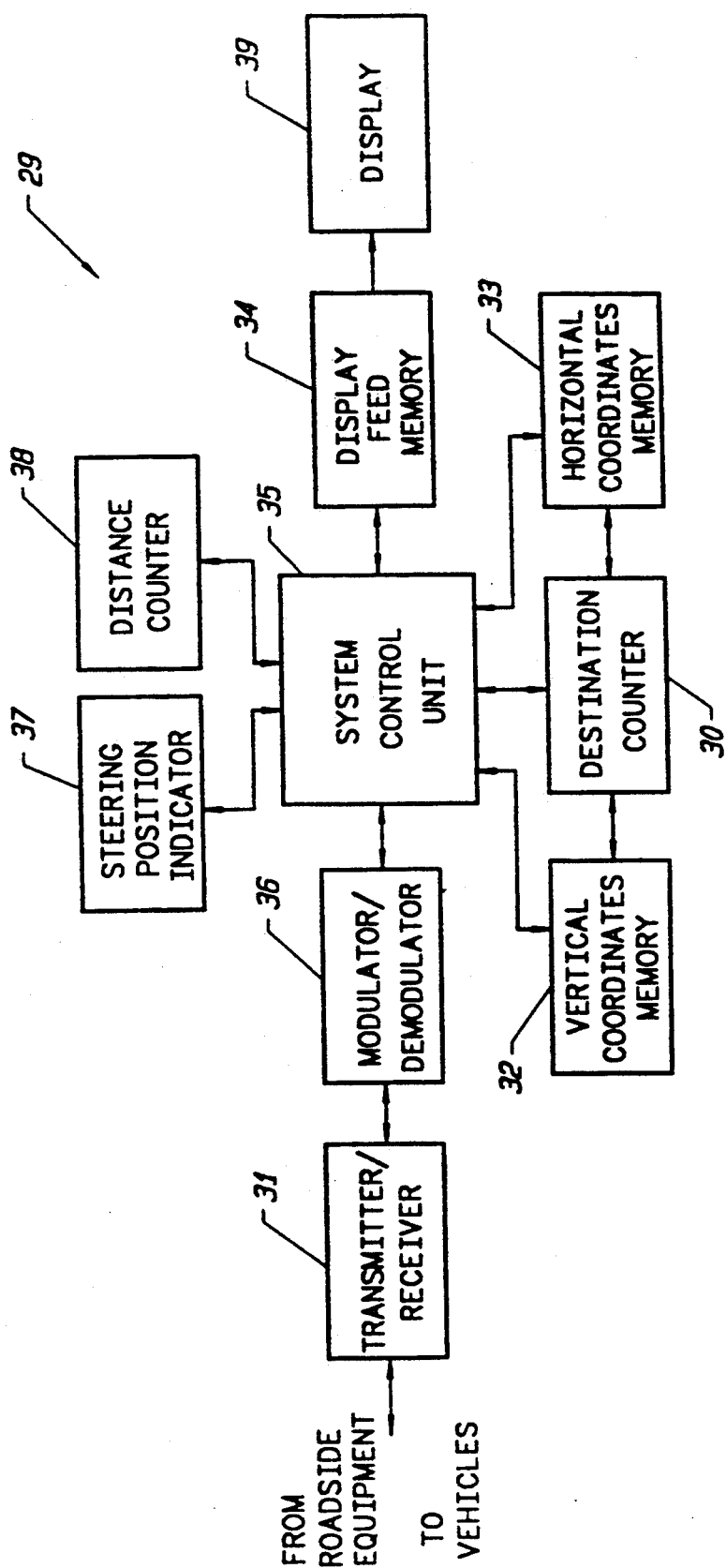
FIG. 3 is a block diagram of the on-board vehicle guidance and control system of the vehicle guidance system of the present invention.

Referring now to FIG. 3, there is shown the third subsystem of the present invention, the vehicle guidance and control system, generally designated 29. Vehicle system 29 comprises transreceiver 31, modulator/demodulator 36, system control unit 35, vertical coordinates memory 32, destination counter 30, horizontal coordinates memory 33, display feed memory 34, display 39, distance counter 38, and steering position indicator 37.

Figure 7:
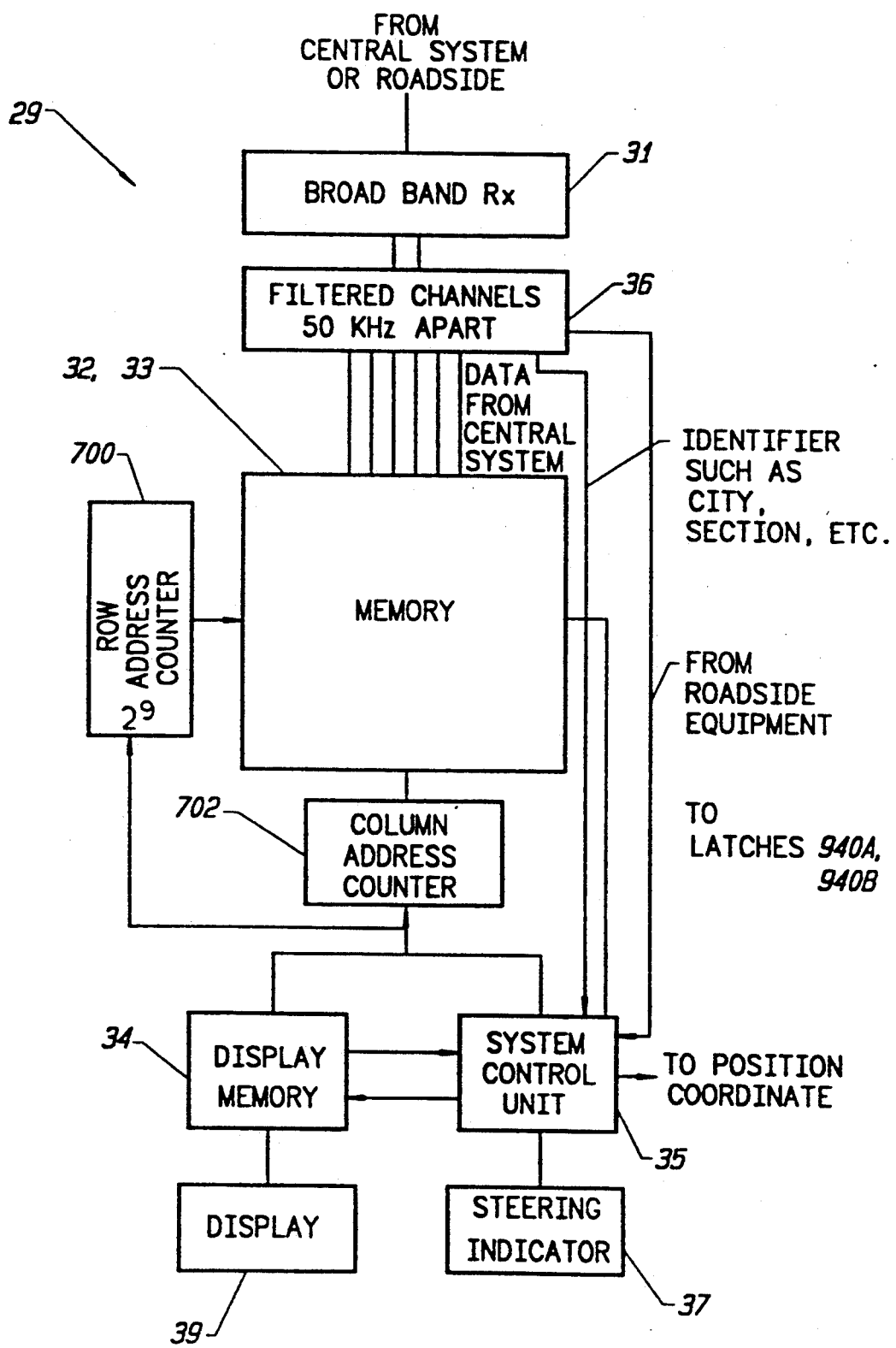
FIG. 7 is a partial, detailed block diagram of the on-board vehicle guidance and control system of FIG. 3.

As best shown in FIG. 7, all signals are received by transreceiver 31 and passed to modulator/demodulator 36 where the signal is demodulated. The two signals, i.e., one arriving from the Traffic Control Office system 8 and the other from the roadside equipment 40 are separated at this stage. The two carrier frequencies in the preferred embodiment are 10 MHz and 12 MHz, respectively.

In particular, the transreceiver 31 and modulator/demodulator 36 first receive and demodulate the address of roadside equipment coordinate. This six-bit address data is forwarded to system control unit 35. The address of that coordinate enters current drivers 946, as best shown in FIG. 9, causing the addressing of coordinate ROM's 942A and 942B. The coordinate is then latched in latches 940A and 940B. The operation of current drivers 946, ROM's 942A and 942B, and latches 940A and 940B will be fully described below.

Simultaneously, modulator/demodulator 36 is demodulating the carrier frequency from central system 8. As stated previously, central system 8 is continuously transmitting data for all sections of a large locality such as a city. When the transmitted city and section code from the Traffic Control Office system 8 corresponds to the instantaneous position as seen by system control unit 35, all received data are transferred to system control unit 35 which in turn stores these information in the vertical coordinates memory tank 32 and horizontal coordinates memory tank 33. This in essence is equivalent to a transfer of information from memory 12 and 13 of Traffic Control Office system s to memory 32, 33 of vehicle equipment 29.

In particular, knowing its instantaneous position, i.e., the coordinate in latches 940A and 940B, system control unit 35, is capable of knowing in which section of the city it is in, as described below. Thus, when the unique identifier for the section that the vehicle is in is detected by system control unit 35, as best shown in FIG. 7, system control unit 35 then permits the acceptance of the data by memory 32, 33. As described previously, the transmission of these data utilized the multi-frequency technique. Demodulator 36 similarly operates in a conventional fashion so as to demodulate the multi-frequenced carrier frequency from central office 8.

Figure 8A:
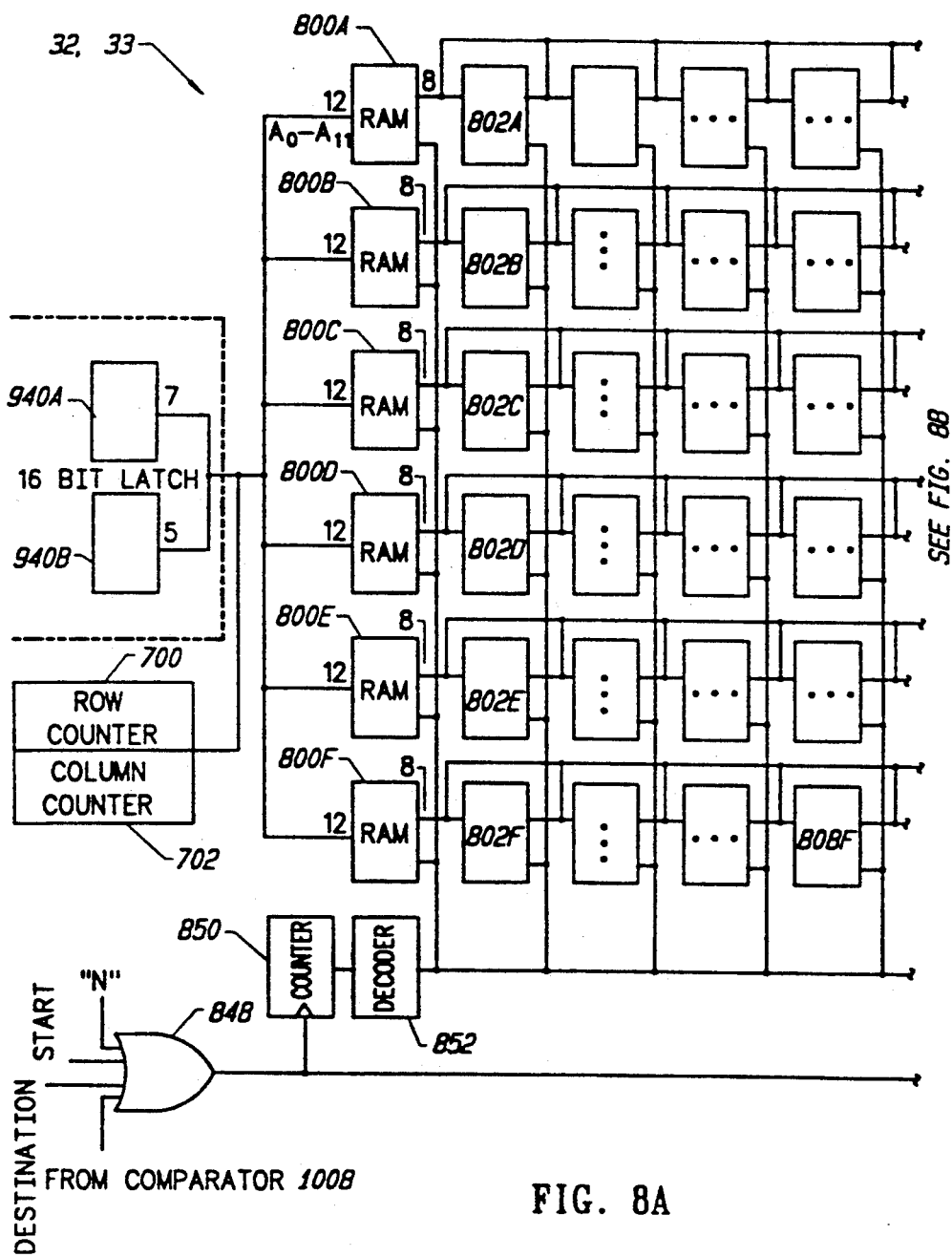
FIGS. 8A-B is a partial, detailed schematic of the on-board vehicle guidance and control system of FIG. 7.
Figure 8B:
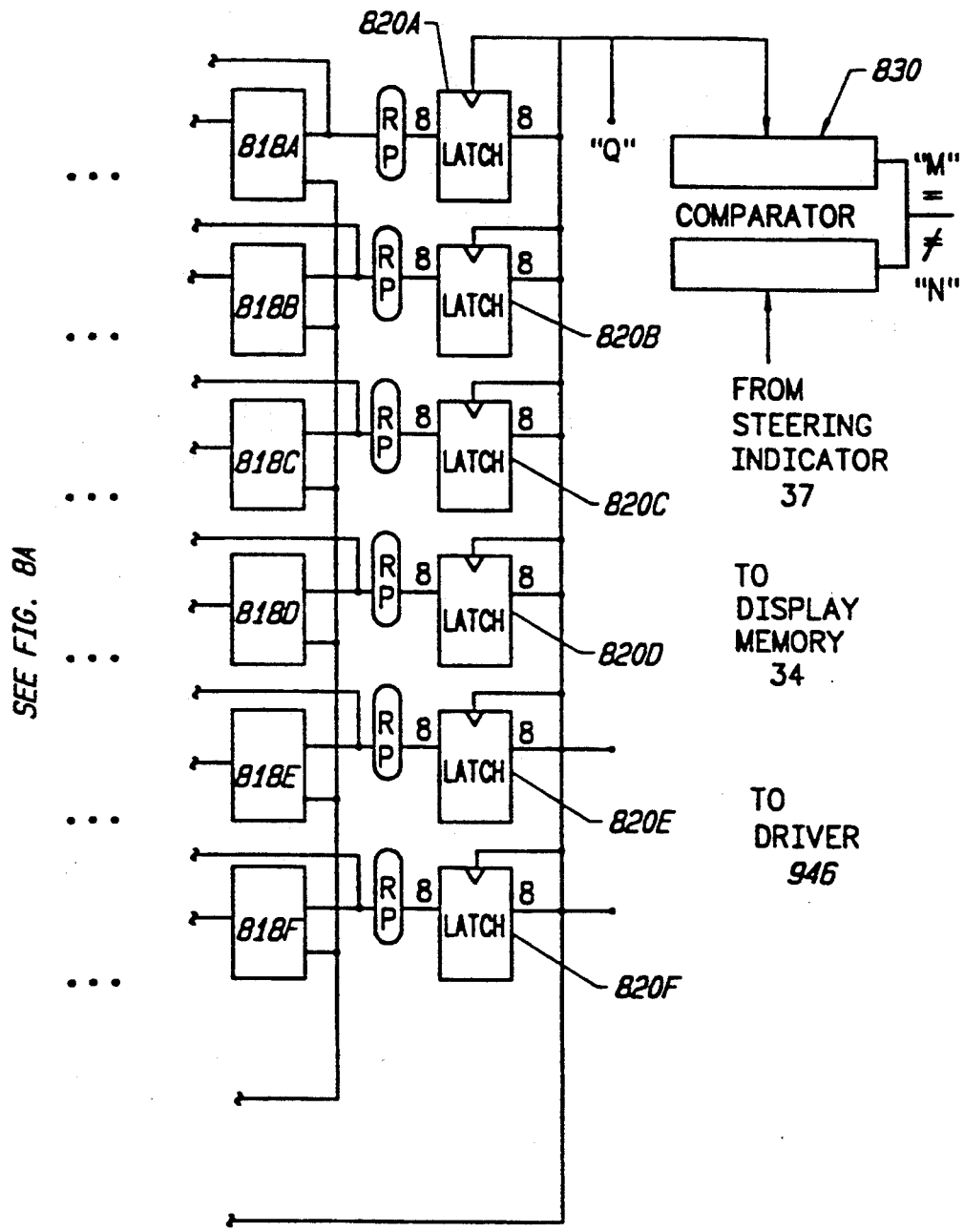
Figure 9A:
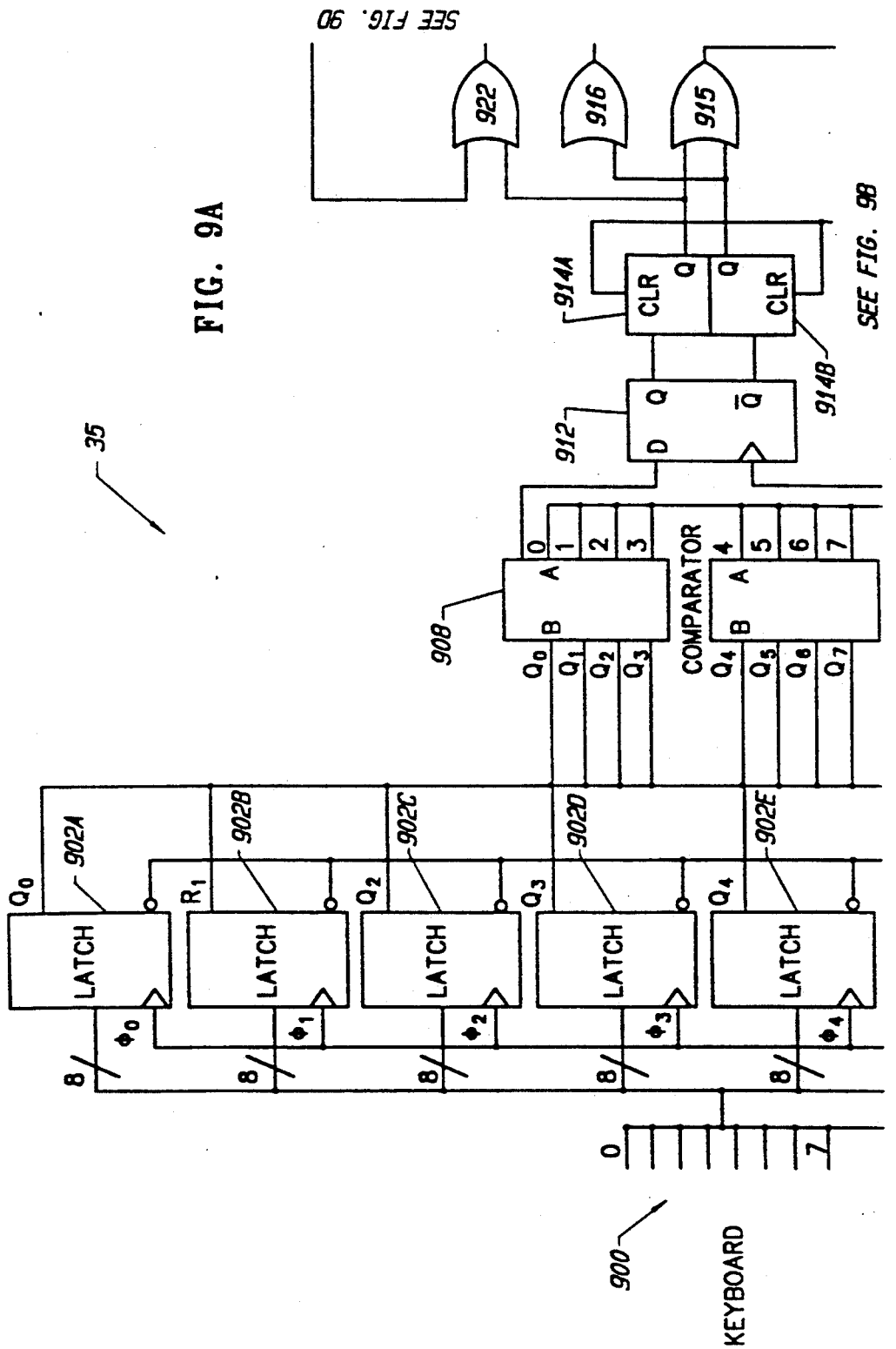
FIGS. 9A-E is a partial, detailed schematic of the system control unit of the on-board vehicle guidance and control system of FIG. 7.
Figure 9B:
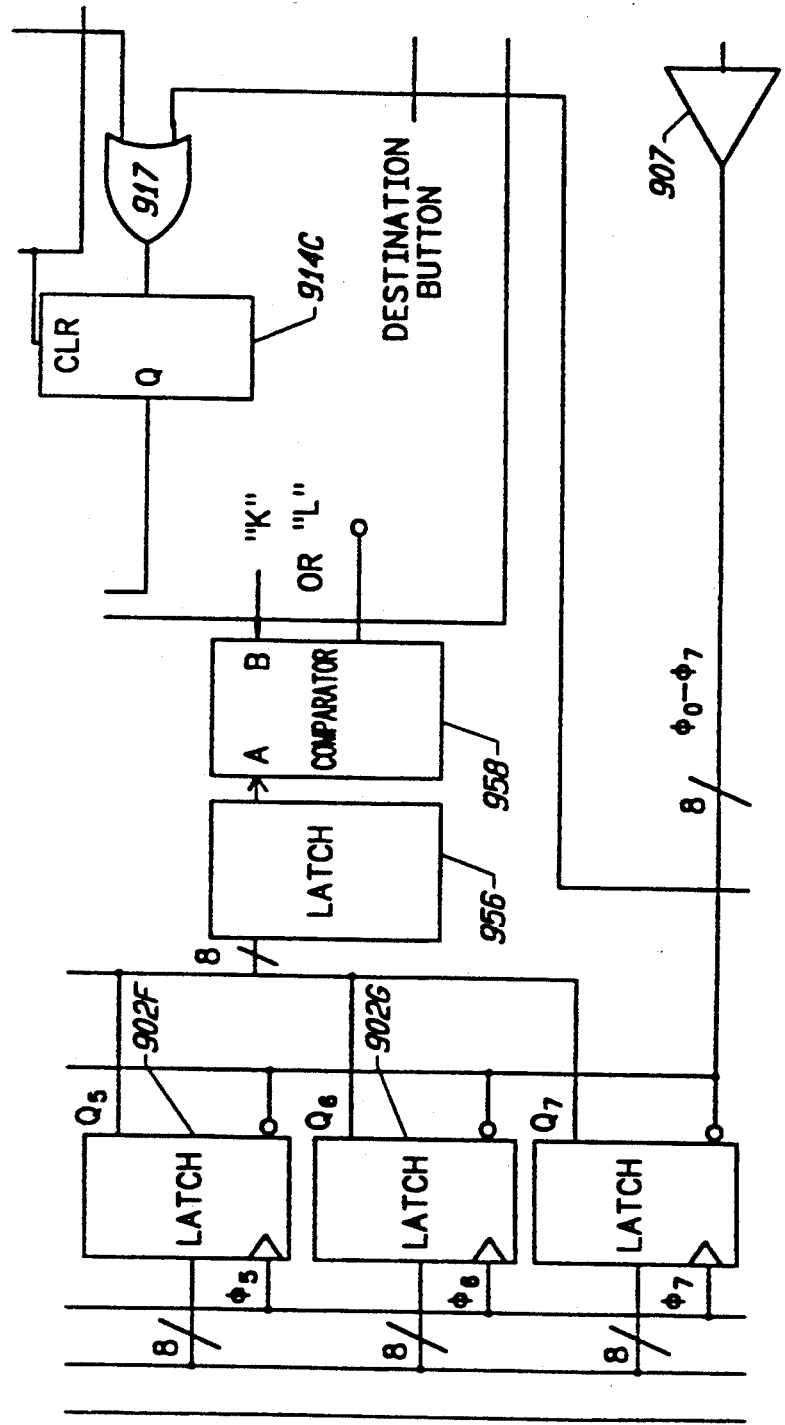
Figure 9C:
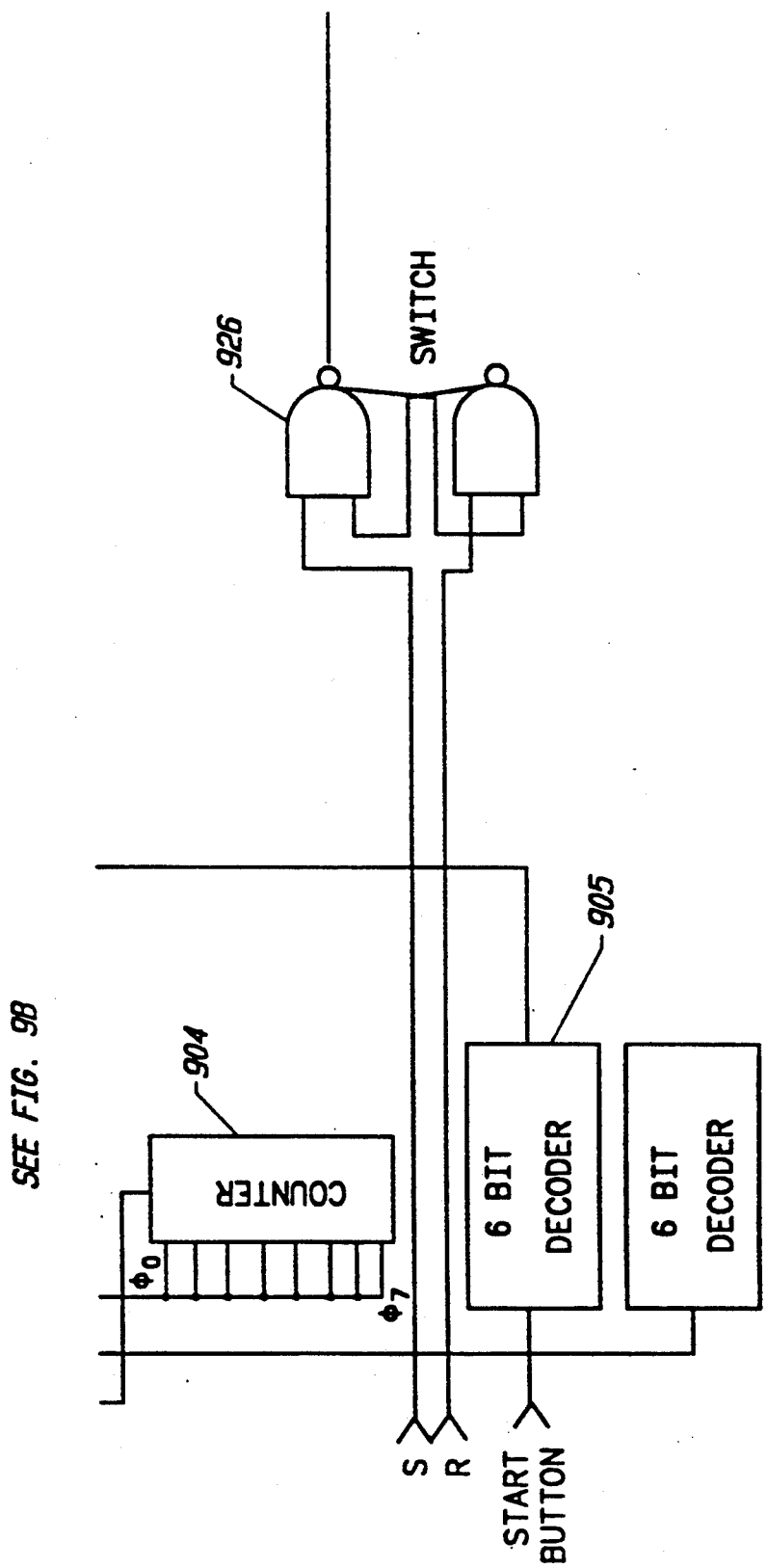
Figure 9D:
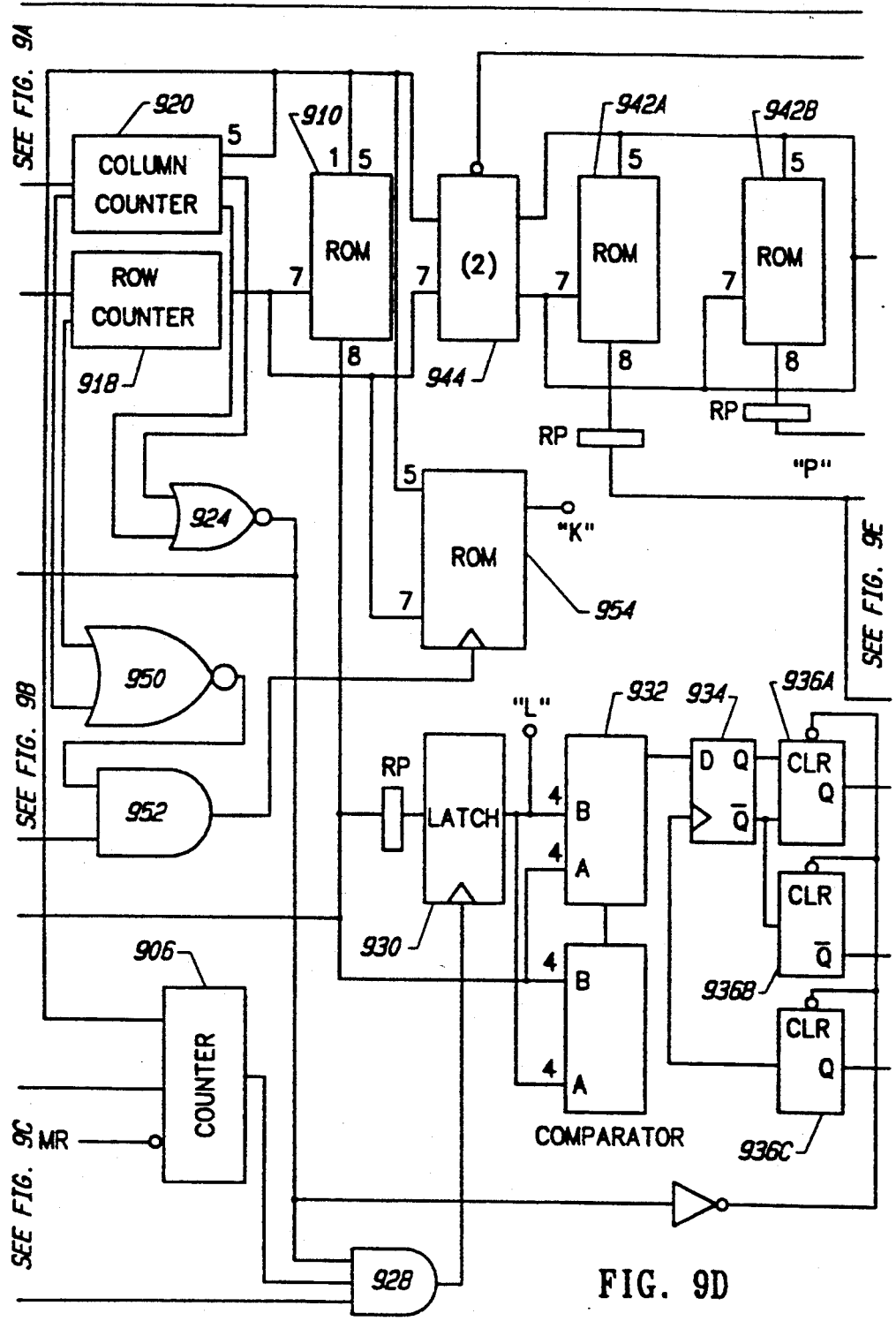
Figure 9E:
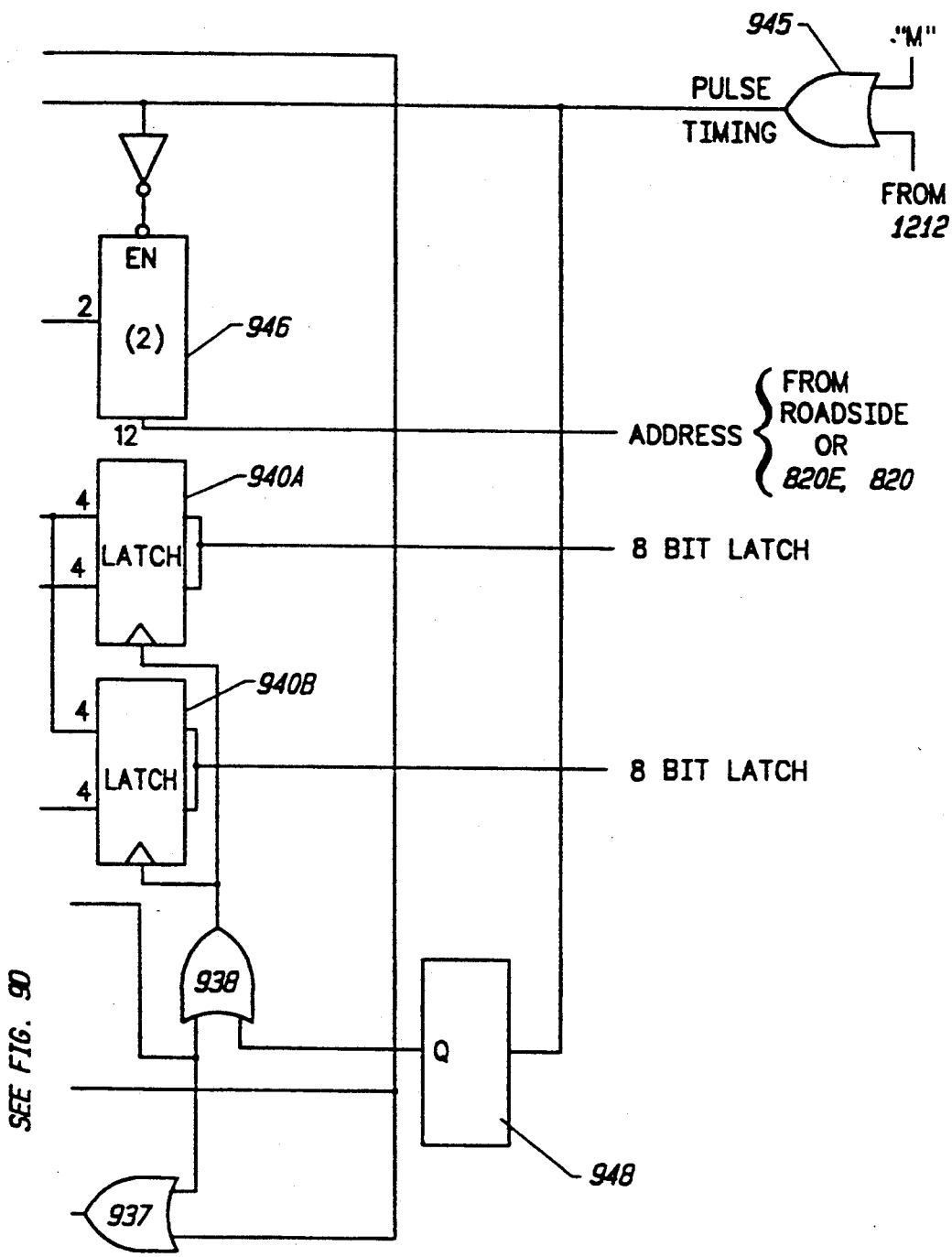

As best shown in FIGS. 7 and 8, system control unit 35 includes conventional row address counter 700 and conventional column address counter 702. In particular, memory 32, 33 comprises a plurality of memory cells which contain the bearing, destination, etc. information. Each of the plurality of memory cells is a conventional random access memory (RAM) device. For example, at the same address location, memory cell 800A contains a bearing that emanates from a point of decision; cell 800B contains information such as gas station, restaurant, etc.; cells 800C and 800D contain the distances to the next point of decision; and cells 800E and 800F contain the address of the coordinate for the next point of decision. In essence, the content of memory 32, 33 is an exact duplicate of that in memory 12, 13 of central system 8. Although memory 32 and 33 are illustrated as two entities in FIG. 3, they nonetheless may be described as a single entity, as illustrated in FIG. 7. The merger or severance of memory 32, 33 is within the knowledge of one skilled in the art.

In this fashion, only that information most relevant to the travelling vehicle is received, e.g., coordinates of a particular section of the city in which it is travelling. When the vehicle now crosses any roadside equipment 40, it receives the exact coordinate of that position. System Control Unit 35 compares this position coordinate with the destination code and using Vertical/Horizontal plane memories 32, 33 as source of information, transfers directions to display memory 34, as described below.

The operation of the remaining subunits of vehicle guidance and control system 29 is as follows. First, the exact location of the vehicle must be ascertained. To initialize this procedure, the driver first inputs his/her present route with a conventional keyboard 900, as best shown in FIG. 9. The hexidecimals representing the alphanumerics entered on keyboard 900 are strobed into a plurality of conventional latches 902A through 902H by strobe counter 904. Unless indicated otherwise, latches 902A-902H, counter 904, and the following elements are subunits of system control unit 35. Strobe counter 904 is disabled once the alphanumerics are stored in latches 902A-902H.

A conventional counter 906 is provided such that it sequentially enables one of the latches 902A-902H so as to permit the transmission of data stored in that particular latch. The operation of counter 906 is described below. A conventional inverter 907 is provided to generate signals having the correct state in order to enable or disable latches 902A-902H. With latch 902A enabled and the remainder disabled, the hexadecimal data representing the first letter of the route that the vehicle is on is forwarded to a comparator 908. The other side of comparator 908 receives data from read only memory (ROM) 910 that contains an alphabetized list of the available routes. At each address of route ROM 910, first there is the hexadecimal representation of letters of that route, and followed by the numerical representation of that route and numerical representation of all routes which cross the route of interest. For example, if the vehicle is on "FOREST" street, the data in that particular address is as follows:

| FOREST | 18 (450) | 6 (78) | 34 (957) | 86 (1768) | where "18" represents "FOREST" and "6" represents "BILLINGS", "34" "LIVERPOOL", and "86" "SUNDSTRAND", BILLINGS, LIVERPOOL and SUNDSTRAND are all cross streets of FOREST.

If the comparison of the most significant bits is unfavorable, i.e., the most significant bits are not the same, a signal is forwarded to a D-type flip flop 912 which in turn outputs a —Q signal. The outputted —Q signal activates a one-shot multivibrator 914B such that an OR gate 916 forwards a signal to a row address counter 918. Row address counter 918 then advances to the next address contained in route ROM 910, i.e., the next route in the alphabetized list. The next route is forwarded to comparator 908. In addition, the presence of the —Q signal from multivibrator 914B or the Q signal from multivibrator 914A, as described below, activates an OR gate 915 which in turn activates another OR gate 917. The outputted signal of OR gate 917 causes a one-shot multivibrator 914C to generate a clock pulse to flip flop 912. The other input of OR gate 917 receives a signal from a conventional 6-bit decoder 905, mounted on keyboard 900, that is activated by the driver to start the coordinate location procedure.

If the first letter of the route is matched, comparator 908 outputs a signal such that the Q signal is generated by flip flop 912. This Q signal triggers a one-shot multivibrator 914A which in turn generates a signal that enters a column address counter 920 via an OR gate 922 such that the column address is advanced to the next column of route ROM 910. Simultaneously, the Q signal advances counter 906 which then enables latch 902B and disables the remainder. In this fashion, the route that the vehicle is on is located in route ROM 910.

As the route name is being selected, the presence of the Q signal at OR gate 922 advances counter 906 which outputs a signal. In addition, column counter 920 outputs signals such that a NOR gate 924 generates a signal. The signals outputted by column counter 920 are the numeral representing the route itself, e.g., "18". This numeral causes NOR gate 924 to generate a signal. The signals of NOR gate 924 and counter 906, coupled with a reset signal "R" from keyboard 900 via switch 926 cause AND gate 928 to output a signal. This outputted signal of AND gate 928 enables latch 930 such that it stores the numeral representing the just-matched routed, e.g., "18".

The driver then inputs the nearest cross route from the route that he is presently on. The inputting of this cross street on keyboard 900 automatically forwards a set signal "S" on keyboard 900. This signal in turn causes switch 926 to disable AND gate 928, thereby removing the enabling pulse from latch 930. Although both the "R" and "S" signal inputs are illustrated as removed from keyboard 900, they nonetheless are part and parcel of keyboard 900. The sequence is then repeated in order to locate the cross street in route ROM 910.

Once the cross street is located in route ROM 910, the numeral representing that cross street is forwarded to a comparator 932. The other side of comparator 932 contains the numeral representing the first located route. As comparator 932 performs the comparison, an inequality naturally ensues, causing comparator 932 to output a signal to a D-type flip flop 934, which in turn outputs a —Q signal to a one-shot multivibrator 936B. The output of one-shot 936B is routed to OR gate 922 which advances column counter 920. This advance of column counter 920 causes it to output the cross street data. If the above example, "FOREST", is a cross street, this advance would output the numeral "6". In this fashion, all streets that cross the just-located cross street are compared sequentially with the initially-selected route. Since the initially-selected route is one of the routes that must cross the subsequently-selected cross street, a match will eventually be made in comparator 932. The signal outputted by either one-shot 936B or 936A, as described below, causes an output at an OR gate 937 which in turn causes a one-shot 936C to generate a clock pulse to flip flop 934.

When an equality is located, comparator 932 outputs a signal that causes flip flop 934 to output a Q signal. This Q signal enables a one-shot multivibrator 936A to forward a signal to an OR gate 938 the output of Which enables latches 940A and 940B. Latches 940A and 940B are provided to receive the vertical and horizontal coordinate contained in coordinate read only memory (ROM) devices 942A and 942B. Coordinate ROM's 942A and 942B are provided to contain the coordinate of the routes stored in route ROM 910. ROM's 942A and 942B are addressed by route ROM 910 such that the address that caused comparator 932 to detect a match is also the address presented at ROM's 942A and 942B. ROM's 942A and 942B are assisted by a pair of conventional current drivers 944. The coordinates stored in latches 940A and 940B are the instantaneous location of the vehicle.

Having located its instantaneous coordinate, system control unit 35 is now capable of tracking the movement of the vehicle. As best shown in FIG. 8, the coordinate stored in latches 940A and 940B can now be used to address the various bearings that emanate from that particular coordinate. As the vehicle ventures into a particular bearing, that bearing is detected by a steering position indicator 37. Steering position indicator 37 in the preferred embodiment is a compass. The full operation of compass 37 is described below. A conventional counter 850 and a conventional decoder 852 are provided, which sequentially compares the bearings emanating from the coordinate contained in latches 940A and 940B. Each bearing is forwarded to a conventional latch 820A which in turn forwards the bearing to a bearing comparator 830 the other input of which is the bearing indicated by compass 37. If a match is not found, its output advances counter 850 which in turn selects the bearing, e.g., memory cell 802A, for comparison.

When a match is located by bearing comparator 830, all of its concomitant data are already present in latches 820B through 820F. First, the distance to the next point of decision contained in latches 820C and 820D are forwarded to display feed memory 34 and displayed on display 39. Display 39 is an inverse counting device that deducts the distance to the next point of decision as the vehicle proceeds toward it. The address representing the coordinate of the next point of decision, which is contained in latches 820E and 820F, is forwarded to a pair of conventional current drivers 946, as best shown in FIG. 9. The presence of a match in bearing comparator 830 enables current drivers 946 and disables 944. With such an address, the coordinate of the next point of decision is selected from ROM's 942A and 942B and latched in latches 940A and 940B. The equality pulse from comparator 830 also activates a one-shot multivibrator 948 the output of which causes OR gate 938 to enable latches 940A and 940B. In this fashion, vehicle guidance and control unit 29 is capable of tracking the travel of the vehicle.

Figure 10:
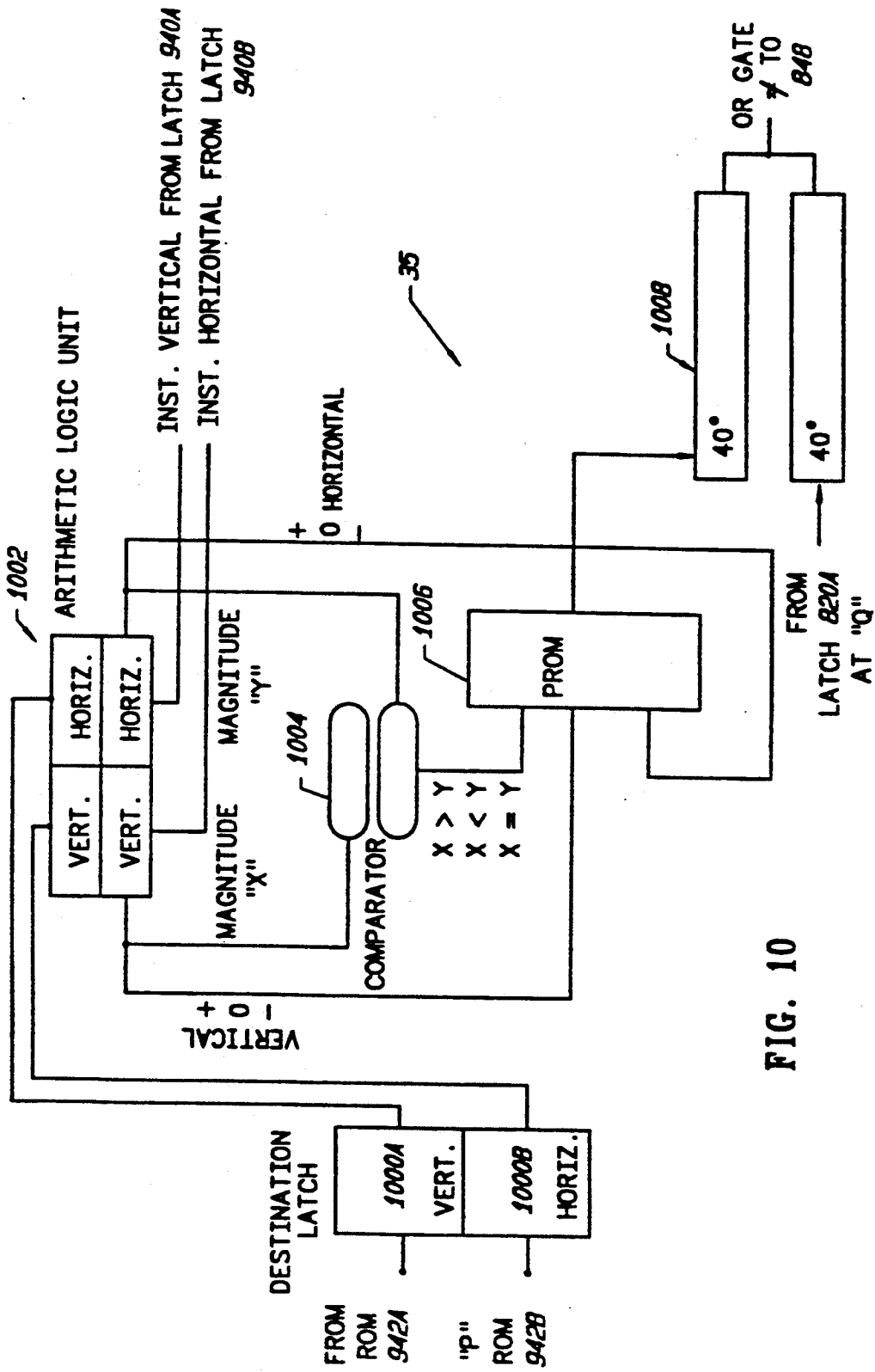
FIG. 10 is another partial, detailed schematic of the system control unit of the on-board vehicle guidance and control system of FIG. 7.

A second aspect of vehicle guidance and control unit 29 is its capability to determine the most efficacious route to a destination point. As best shown in FIG. 10, the destination coordinate is latched into conventional latches such as latches 1000A and 1000B. The destination was originally entered by the driver on keyboard 900. Utilizing the same procedure that determined the vehicle's present coordinate, the driver similarly entered the name of the street and the number of the house. The street name is determined as described previously. The determination of the house number is slightly different. Once a number is to be determined, the operation seeks to determine the numbers in the parenthesis, e.g., (450), (78), (957) and (1768), as illustrated previously. Each of these numbers is the house number for the first house at the intersection of a cross street. Once the street has been determined, column counter 920 outputs signals which enables a NOR gate 950, which in conjunction with the "Destination" signal enable an AND gate 952. The output of AND gate 952 enables a conventional ROM 954 that stores the house numbers. The house numeral entered at keyboard 900 is latched into latch 956 which is then forwarded to a comparator 958 the other side of which receives the house numbers from ROM 954. The procedure to determine the house number proceeds in a normal fashion with the output of comparator 958 entering flip flop 934. The coordinate of the destination is again located in ROM's 942A and 942B. The coordinate of the destination is then latched into latches 1000A and 1000B.

An arithmetic logic unit 1002 is provided in which the destination coordinate is positioned on one side of unit 1002 and the instantaneous coordinate is positioned on the other side. For example, if the coordinates of roadside equipment 40 is again (30.02, 9.11) and the desired destination is (30.06 9.22) arithmetic unit 1002 detects the differences as +4 horizontal and +11 vertical. These two figures are then compared by a comparator 1004 to determine the relative value between them, e.g., whether one is greater or less than the other, or whether they are equal.

As best shown in FIG. 11A, the magnitude of the difference between the two coordinates and their relative value are derived in light of the following coordinate system. Two imaginary orthogonal lines create four quadrants. In the horizontal direction, values increase in the rightward direction, i.e., west to east. Similarly, values increase in the downward vertical direction, i.e., north to south. If one is presently located at the zero intersection or instantaneous location "I" and selects a destination point "D" that is located in the first or upper right quadrant, subtracting the coordinate of "D" from the instantaneous coordinate "I" would result in certain magnitudes, as described previously. In addition, the magnitude of the resultant horizontal ($\Delta h$) is a negative number and the resultant vertical ($\Delta v$) positive. Thus, a negative horizontal and a positive vertical denote the first quadrant. Similarly, the second or lower right quadrant has positive horizontal and vertical; the third positive horizontal and negative vertical; and fourth both negative.

In this fashion, the resultant horizontal and vertical direction are inputted into a conventional read only memory (ROM) device 1006. The magnitudes of the subtraction are forwarded to comparator 1004. In essence, these two magnitudes are the legs of a triangle such that tangent could be determined to be greater or less than 45 degrees, or equal to 45 degrees. The positive or negative directions of the tangents are forwarded to ROM 1006. These values form a 9-bit digital word, for example:

| MAGNITUDE | | | HORIZONTAL | | VERTICAL | | |
|---|---|---|---|---|---|---|---|
| X > Y | X < Y | X = Y | + | o | − | + | o | − |
| 1 | 0 | 0 | 0 | 0 | 1 | 1 | 0 | 0 |

This digital word is an address such that a predetermined bearing stored in ROM 1006 at that address is outputted to a comparator 1008.

Since the coordinate of the instantaneous coordinate is held in latches 940A and 940B, as best shown in FIG. 8, each of the possible bearings emanating from that instantaneous position is contained in memory 32, 33. Similar to the procedure described previously, each bearing is forwarded to comparator 1008. When a match is detected, that bearing and its associated data are forwarded to display feed memory 34. These data represent the first segment of a proposed route for the vehicle. As segment d11 is selected, its coordinates and direction are transferred to display feed memory 34. Display feed memory 34 in the preferred embodiment is a conventional first-in first-out random access memory such that subsequent proposed segments are listed in sequential order. As described previously, the address of the coordinate of the next point of decision contained in cells 820E and 820F is then forwarded to current drivers 946. Current drivers 946 in turn causes ROM's 942A and 942B to output the coordinate of the next point of decision. That coordinate is latched in latches 940A and 940B. The coordinate of the next point of decision is now deemed to be the instantaneous location and forwarded to arithmetic logic unit 1002. Segments d13, d16, d18 and d68 are then sequentially selected and transferred to display feed memory 34. In this fashion, a plurality of connected bearings are selected such that if the vehicle followed these suggested bearings, it will reach the destination point.

The remaining function of vehicle guidance and control unit 29 is to guide the vehicle along the proposed route. Display feed memory 34 now contains information relating to all distances and associated directions from the position of the roadside equipment up to the vehicle's final destination. The first destination point or point of decision, the distance and the instruction for reaching that destination is displayed in a bottom window of conventional display 39, as best shown in FIG. 12, while the second point of decision and its distance and instruction for reaching that second destination is displayed on the top window of the display 39, not shown.

The distance covered by the vehicle is recorded in distance counter 38. The distance recorded by distance counter 38 is being continuously deducted from the calculated distance displayed at the bottom window of display 39. When the vehicle reaches the first destination or point of decision, the displayed distance on the bottom window of display 39 is "0". Display 39 then displays the information of the next destination point.

If instruction is followed by the motorist, steering position indicator 37 issues the correct signal to the System Control Unit 35, System Control Unit 35 then transfers the information contained in the top window of display 39 to the bottom and the information in display feed memory 34, containing the third destination or point of decision, is then displayed in the top window. This chain of events continues until the desired destination is reached. However, if at any one time the motorist fails to follow the instruction for direction displayed, steering position indicator 37 informs System Control Unit 35 the vehicle's failure to follow instructions. In this case, System Control Unit 35 clears display feed memory 34 and, using the point at which error occurred as a starting reference, computes an alternative route. The information relating to the alternative route is then stored in display Feed Memory 34 in a similar manner as described earlier. The same steps are then followed until the final destination is reached. This was made possible because all relevant information for the particular section concerned is still intact in vertical memory 32 and horizontal memory 33.

Figure 12:
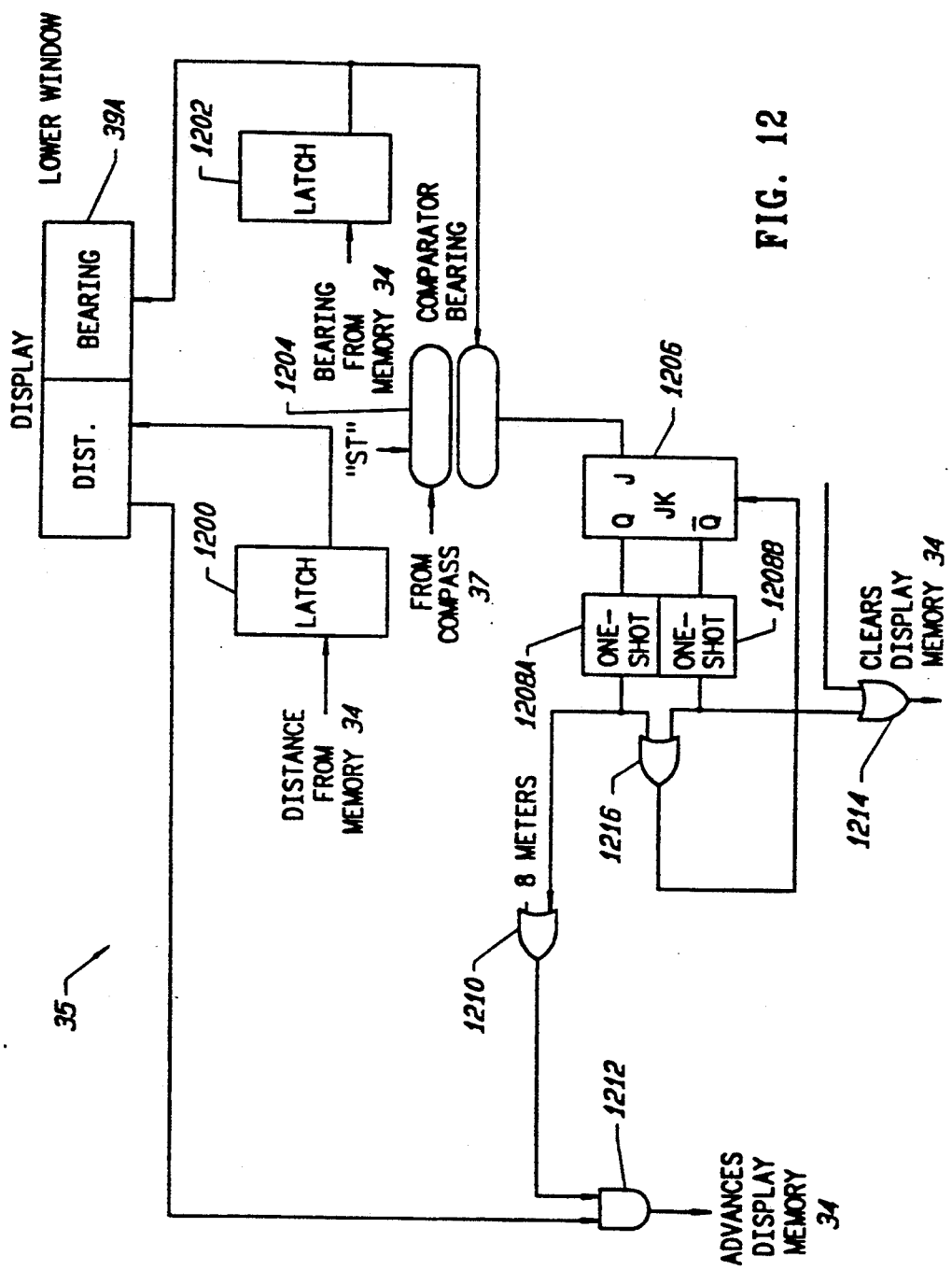
FIG. 12 is a further partial, detailed schematic of the system control unit of the on-board vehicle guidance and control system of FIG. 7.
Figure 13A:
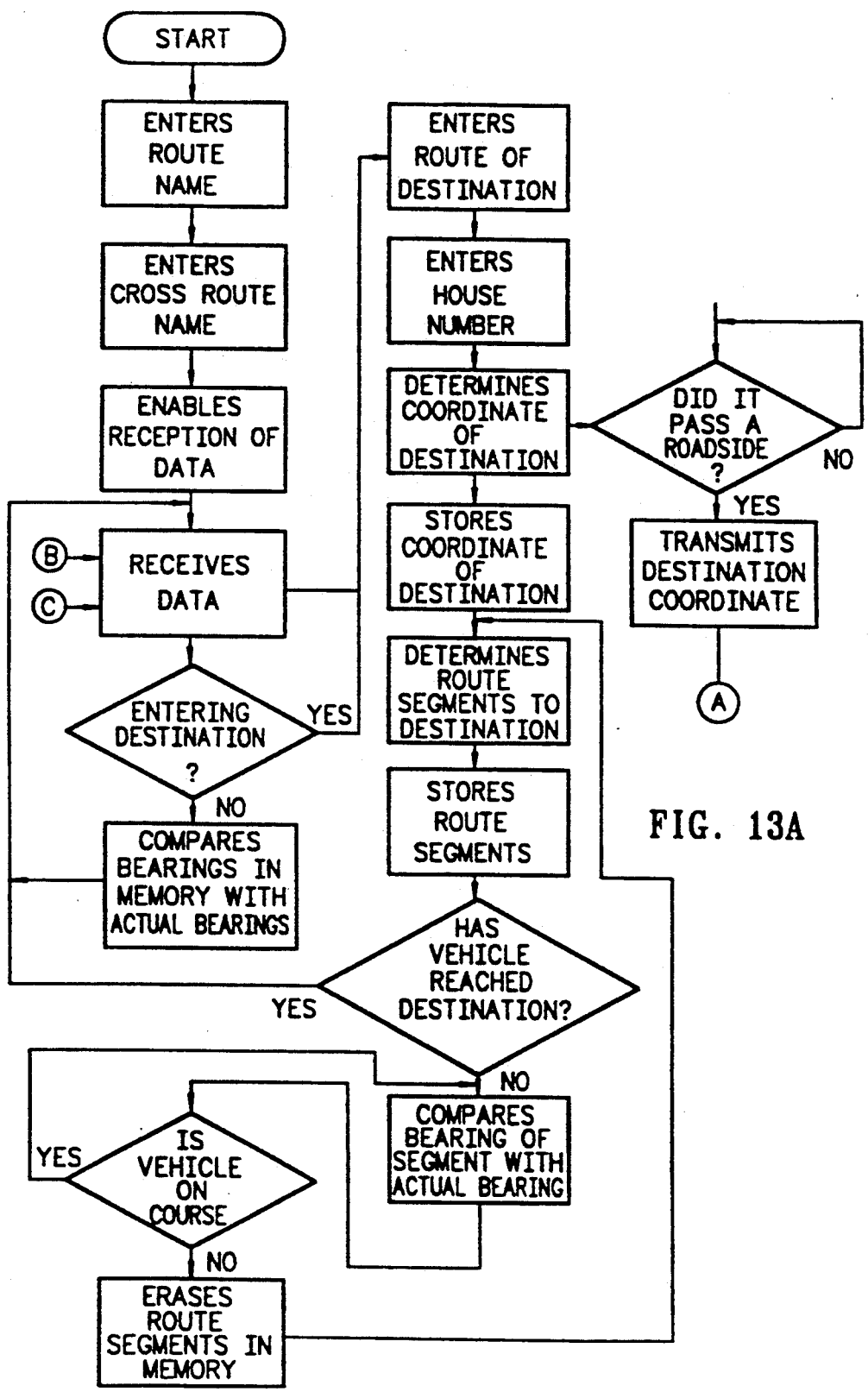

In particular, as best shown in FIG. 12, bottom window 39A of display 39 is provided to display the distance and bearing of the next point of decision. These data were inputted from display feed memory 34 via a distance latch 1200 and a bearing latch 1202. In addition, the bearing to reach the next point of decision is also forwarded to a comparator 1204. Comparator 1204 also receives the actual bearing indicated by steering position indicator 37. Steering indicator 37 in the preferred embodiment includes a compass and five conventional magnetic sensors mounted on a steering wheel, as best shown in FIG. 11B. Sensor "ST" is to detect a straight steering wheel; sensors "SL" and "SR" left and right hand turns; and sensor "SU" and "SW" the U-turns.

As the distance on window 39A reaches zero, indicating that the vehicle has reached a point of decision, the data for the next point of decision is transferred from the top window to lower window 39A. This transfer of information is accomplished by display feed memory 34 via latches 1200 and 1202. If the vehicle made a turn at the intersection and after sensor "ST" detects that the steering wheel has returned to the center position, it triggers comparator 1204. If the actual bearing indicated by compass 37 matches with the proposed bearing, indicating that the vehicle has entered into the proposed segment, comparator 1204 outputs a signal to a conventional JK flip flop 1206 which in turn outputs a signal to a conventional one-shot multivibrator 1208A. One-shot 1208A in turn outputs a signal that activates an OR gate 1210, the output of which is forwarded to an AND gate 1212. The other input of AND gate 1212 is a signal forwarded by lower window 39A as the previous distance reached zero. The presence of the signal from window 39A and the signal from OR gate 1210 causes AND gate 1212 to output a signal that permits display feed memory 34 to output the subsequent point of decision to upper window of display 39. If the vehicle did not make any turns at the point of decision, i.e., it merely crossed the intersection and proceeded in a straight course, an internal clock generates a delay equivalent to eight meters of distance is forwarded to OR gate 1210. Since sensor "ST" still detects a straight steering wheel, comparator 1204 is activated. If the vehicle made a U-turn, sensors "SU" and "SW" cause the distance counter in display 39A to reverse its numeral such that the just-travelled distance becomes the distance to the next intersection.

If the vehicle failed to turn into the proposed segment, comparator 1204 detects an inequality and outputs a signal to flip flop 1206 which in turn causes it to output a −Q signal. This signal causes a one-shot 1208B to generate a signal to OR gate 1214. OR gate 1214 outputs a signal that clears the stored proposed segments in display feed memory 34. Since the tracking aspect of vehicle guidance and control unit 29 was functioning independent of the guidance aspect, latches 940A and 940B still contain the coordinate of the instantaneous position, i.e., the bearing of the segment that the vehicle is in. With display feed memory 34 cleared, the coordinate of the instantaneous position is forwarded to arithmetic logic unit 1002, as best shown in FIG. 10. The coordinate of the destination point has been similarly preserved in latches 1000A and 1000B. Thus, a new plurality of proposed segments may be calculated and stored in display feed memory 34.

If the driver had wished to erase the contents of display feed memory 34, he could have manually selected a RESET button the signal for which also enters into OR gate 1214. An OR gate 1216 is provided to clock flip flop 1206.

In the disclosed system, one of the most difficult propositions is to acquire a technique which can continuously track the position of the vehicle when it is travelling without a destination.

This can happen when the motorist has reached his destination but passes it because he could not park or did not stop for some other reason. This presents two possible conditions. First, similar to what was described previously, that vehicle may be tracked in a section where the corresponding information is still available in Vertical/Horizontal memories 32, 33.

When the vehicle passes its desired destination, display feed memory 34 informs System Control Unit 35 about this variation from the planned route. System Control Unit 35 automatically registers this coordinate and stores this information in Vertical and Horizontal memories 32, 33. The system now awaits for the upcoming point of decision. The action taken by the motorist at the upcoming point of decision is recognized by steering position indicator 37 and this information is passed to System Control Unit 35. Based on the information, System Control Unit 35 advances destination counter 30 in such a way as to pinpoint the current coordinates of the vehicle, as described previously. This new distance value located in destination counter 30 is transferred via display feed memory 34 to display 39. This new vehicle coordinate is registered in System Control Unit 35 and the entire system waits for the motorist's action at the next point of decision. This chain of events will continue wherever the motorist strays within that section and the exact location of the vehicle is being continuously registered within System Control Unit 35.

For example, if the motorist was at coordinates (30.02, 9.11) and wished to reach destination (30.06, 9.22), but errored at (30.05, 9.18) and entered d57 instead of d18, horizontal memory 33 does not vary since the horizontal direction of d57 is identical to the horizontal direction of planned route d68. The vertical difference, however, is now +4. Thus, new alternative segments d57 and d76 are transferred to display feed memory 34.

The second possible condition is tracking in a section where the corresponding information is not available in Vertical/Horizontal Memory Tanks 32, 33. This problem occurs when the motorist wonders outside the boundary of his section and enters into another section. At the point of entry of another section, that roadside equipment transmits its coordinates to vehicle equipment 29. This is an indication to System Control Unit 35 that the vehicle is entering another section. System Control Unit 35, therefore, permits the reception of information in connection with the newly entered section in the same manner as described previously. The coordinates of this new section are then entered into vertical and horizontal memories 32, 33 after the information concerning the preceding section had been erased.

In the meantime distance counter 38 counts the distance covered by the vehicle. Whenever an action is taken by the motorist at a new point of decision, that action is detected and the associated distance of that new coordinates is transferred to display feed memory 34. Once the coordinates of the new section are received by Vertical and Horizontal memory 32, 33, System Control Unit 35 starts the procedure of comparing any new distances from Vertical/Horizontal memory tanks 32, 33 with the coordinates from display feed memory 34 until the coordinates which correspond to the coordinates of the initial location of the vehicle is reached. The system then repeats the same procedure as described previously for tracking a vehicle that is travelling within a section.

In this manner the instantaneous position of the vehicle is known and if the motorist now desires to go to a certain destination there is no problem in establishing the starting point reference.

In operation, as best illustrated in FIGS. 13A through 13D, central system s continuously transmits the coordinate data from its memory 12, 13. As a driver starts up his vehicle, he enters the names of the street he is on and the nearest cross street on keyboard 900. Vehicle guidance and control system 29 then determines the coordinate of this particular location. Having this particular location also permits vehicle system 29 to receive only the relevant data which are being transmitted by central system 8. If the driver does not want to be guided to a destination point, vehicle system 29 merely tracks the movement of the vehicle by determining the bearing of the route the vehicle is on and the upcoming point of decision and the distance to that point.

If the driver wishes to be guided to a particular destination, he inputs the name of the street and house number. Vehicle system 29 then determines the most efficacious route and stores the plurality of road segments that would lead to that destination. In its travel towards that destination, vehicle system 29 displays the distance to the next point of decision and information such as right or left turns, or straight ahead. If the driver fails to follow the suggested route for whatever reasons, vehicle system 29 continues to track the movement of the vehicle and quickly redetermines the most efficacious route to the destination.

Once the driver has selected a destination, the coordinate of that destination is transmitted whenever it passes roadside equipment 40. Equipment 40 receives the vehicle's destination coordinate and retransmits not only the destination but also its own coordinate. When roadside equipment 40 detects a passing vehicle, it transmits its coordinate to that vehicle.

Receiving both the vehicle's destination and the coordinate of roadside equipment 40, central system 8 records both the passage of that vehicle and the destination of that vehicle. Its route analyzer 16, duplicating the function of vehicle system 29, then determines a route that the vehicle would probably take in order to reach the destination. This calculation is based on the coordinate of the destination in relation to the instantaneous coordinate of roadside equipment 40. Predictor 14 then determines whether or not certain segments of the conjectured route are congested. If a particular segment is congested, it causes system control unit 10 to alter the memory content for that particular segment during subsequent transmission of memory 12, 13 such that vehicles receiving the information will not be guided into that segment.

It will be apparent to those skilled in the art that various modifications be made within the spirit of the invention and the scope of the appended claims.

What is claimed is:

1. A vehicle guidance system for guiding a motor vehicle in a municipality wherein locations within said municipality are designated by respective horizontal and vertical coordinate means, said system comprising:
   a central traffic control system including:
   means for transmitting dynamically alterable coordinate information representative of the whereabouts of congested route segments for use as route guidance information in accordance with detected traffic conditions,
   at least one roadside equipment including:
   horizontal and vertical coordinate memory means for storing coordinate information representative of said whereabouts of said congested route segments, roadside transmitter means for transmitting roadside identification information indicative of the location of the transmitting roadside equipment and for transmitting to said vehicle said route guidance information received from the central traffic control system, an on-board guidance unit including:

on-board receiver means for receiving said identification information and said route guidance information transmitted by said roadside equipment, on-board vertical and horizontal coordinate memory means for storing said vertical and horizontal coordinate information transmitted from said roadside transmitter, an on-board system control unit for controlling the reception and storage of said identification information and said route guidance information, means for altering said coordinate information in said on-board memory means in accordance with said route guidance information transmitted by said roadside equipment, and said on-board system control unit including means for generating vehicle guidance information in accordance with data contents of said on-board memory means and for transferring said vehicle guidance information to a display means for assisting a driver in guiding said vehicle.

2. The vehicle guidance system as recited in claim 1 wherein said on-board guidance unit includes transmitting means for transmitting at least one of destination and position information of said vehicle to said roadside equipment, and wherein said roadside equipment further comprises:

roadside receiver means for receiving said at least one of said destination information and said position information, and means for relaying said received information to said central traffic control system, said central traffic control system further including:

counter means which receives information from said roadside receiver means and for counting the number of vehicles traversing a location, destination recorder means for recording the destination of said vehicle, route analyzer means for analyzing traffic flow information in accordance with said counter means and said destination recorder means, predictor means responsive to said route analyzer means for predicting route congestion and for generating guidance instructions in order to permit said vehicle to circumvent the predicted congestion, and said roadside transmitter means transmits said guidance instructions to said vehicle whereby to enable avoidance of said predicted route congestion.

3. The system as recited in claim 1 or 2 wherein the on-board guidance unit includes an instantaneous position register having data contents which indicate the position of said vehicle and means for correcting the data contents of the position register in accordance with the identification information transmitted by said roadside equipment.

4. A vehicle guidance system as recited in claim 1 or 2 wherein said on-board guidance unit further comprises:

route determination means for calculating a desired route comprising a series of decision points between an instantaneous position and a destination of said vehicle.

5. A vehicle guidance system as recited in claim 1 or 2 wherein said on-board guidance unit further comprises:

distance counter means for measuring and recording a distance traveled by the vehicle toward one of the decision points, wherein the distance counter means interacts with the on-board system control unit to display the distance remaining to said one decision point and to display instructions for reaching said one decision point.

6. The vehicle guidance system as recited in claim 5, wherein said on-board guidance unit further comprises:

steering position indicator means for determining and indicating a vehicle turning condition wherein the steering position indicator means interacts with the on-board system control unit and the distance counter means to track the movement of the vehicle.

7. A vehicle guidance system as recited in claim 1 or 2 wherein said central traffic control system includes a plurality of roadside equipments spaced throughout said municipality for communicating with said vehicle, said on-board guidance unit transferring information with at least one of said plurality of roadside equipments for retransmission to said central traffic control system.

8. A system for monitoring and guiding motor vehicles in a municipality comprising a central traffic control, a plurality of roadside equipments, and at least one vehicle having an on-board guidance unit wherein:

said central traffic control comprising, central memory means for storing coordinate and route guidance information, central transmission means for transmitting dynamically alterable coordinate information indicative of congested route segments in said municipality for use as route guidance information to said plurality of roadside equipments, central receiving means for receiving information from said plurality of said roadside equipments, and control means for controlling the transmission of said route guidance information to said roadside equipments;

at least one of said roadside equipments comprising, roadside memory means for storing coordinate information representative of the location of said at least one roadside equipment, first receiver means for receiving said route guidance information transmitted by the central traffic control, first transmission means for transmitting to said at least one vehicle at least one of said coordinate information of said at least one roadside equipment and said route guidance information, second receiver mans for receiving at least one of vehicle position and vehicle destination information from said at least one vehicle, and second vehicle destination transmitter means connected to said second receiver means for transmitting the information received by said second receiver means to the receiver means of said central traffic control;

said on-board guidance unit comprising, on-board memory means for storing at least one of instantaneous position information and vehicle destination information, on-board receiver means for receiving at least one of said coordinate and route guidance information transmitted by the first transmission means of said at least one roadside equipment, on-board control means for controlling the reception of the information received by said on-board receiver means, and display means for displaying a representation that is indicative of at least one of said instantaneous position information and said route guidance information transmitted by said central traffic control.

9. A system as recited in claim 8 wherein said central traffic control further comprises:

means for monitoring traffic load conditions in said municipality, means for generating congestion avoidance information based upon said load conditions, and wherein said route guidance information transmitted by said central traffic control includes said congestion avoidance information.

10. A system as recited in claim 8 wherein said central traffic control further includes predictor means for predicting congestion at a certain location in said municipality, said predictor means comprising:

means for receiving position and destination information of vehicles, means for determining congestion at said certain location based upon the position and destination of said vehicles, and means for generating congestion avoidance information in accordance with said means for determining, wherein said route guidance information transmitted by said central traffic control includes said congestion avoidance information generated by said predictor means.

11. A method for use in a traffic management system for directing the movement of a motor vehicle in a municipality wherein the system comprises a central traffic control which includes at least one roadside equipment for communicating with passing vehicles and at least one on-board monitoring unit located in a vehicle, and wherein locations within said municipality are designated by respective horizontal and vertical coordinate means, said method comprising the steps of:

in the central traffic control;

transmitting dynamically alterable coordinate information representative of congested routes for use as route guidance information in accordance with detected traffic conditions, in said at least one roadside equipment;

providing horizontal and vertical coordinate memory means for storing coordinate information representative of said congested routes, transmitting roadside identification information indicative of the location of the transmitting roadside equipment and transmitting to said vehicle said route guidance information received from the central traffic control for avoiding said congested routes, in said on-board guidance unit including;

providing on-board receiver means for receiving said identification information and said route guidance information transmitted by said roadside equipment, storing vertical and horizontal coordinate information representative of said congested routes in an on-board vertical and horizontal coordinate memory means, controlling the reception and storage of said identification information and said congested route information, updating said coordinate information in said on-board memory means in accordance with coordinates representing said congested routes transmitted by said at least one roadside equipment, and generating vehicle guidance information in accordance with data contents of said on-board memory and transferring said vehicle guidance information to display means for assisting a driver in directing said vehicle in said municipality.

12. A method as recited in claim 11 further including the steps of:

transmitting from said vehicle one of destination and position information of said vehicle to said at least one roadside equipment, receiving from said vehicle at said at least one roadside equipment one of said destination information and said position information, and relaying said received information from said at least one roadside equipment to said central traffic control system, counting at the central traffic control information received from said at least one roadside representing the number of vehicles traversing a location, recording the destination of said vehicle, analyzing traffic flow information in accordance with said counted number of vehicles and said recorded destination, predicting route congestion based on said analyzed traffic flow information and generating said route guidance information in order to permit said vehicle to circumvent said predicted route congestion, and transmitting from said roadside transmitter means said route guidance information to said vehicle whereby to enable avoidance of said predicted route congestion.

13. A method as recited in claim 11 or 12 further including the steps of:

providing an instantaneous position register in said on-board guidance unit having data contents which indicate the position of said vehicle, and correcting the data contents of said position register in accordance with the identification information transmitted by said at least one roadside equipment.

14. A method as recited in claim 11 or 12 further including the step of calculating a route to determine a series of decision points between an instantaneous position and a destination of said vehicle and displaying said calculated route to an operator of said vehicle.

15. The vehicle guidance system as recited in claim 11 or 12 further including the step of:

measuring and recording a distance traveled by the vehicle toward one of the decision points wherein the distance interacts with the on-board guidance unit to display the distance remaining to said one decision point and to display instructions for reaching said one decision point.

16. A method as recited in claim 15, further including the step of determining the steering position of said vehicle during a turning condition wherein the steering position indicator means interacts with the on-board system control unit and the distance counter means to track the movement of the vehicle.

17. A method as recited in claim 11 or 12 further including the steps of:

transmitting from said vehicle at least one of said destination and coordinate information of said vehicle to one of a plurality of roadside equipments spaced throughout said municipality, and retransmitting said at least one information from one roadside equipment to said central traffic control.

18. A vehicle guidance system for guiding a motor vehicle in a municipality wherein locations within said municipality are designated by a plurality of decision points represented by horizontal and vertical coordinates and a plurality of links interconnecting said decision points, said system comprising a central traffic control system which includes at least one roadside equipment and at least one on-board guidance unit located in said vehicle, said central traffic control system including;

memory means for storing in a primary data segment a representation of at least one primary street in the municipality having an associated plurality of decision points representing crossing streets intersecting said at least one primary street, and for storing in a crossing street data segment representations of vertical and horizontal coordinate information associated with said decision points along said at least one primary street, means for transmitting a representation of data contents of said memory means wherein said contents are dynamically alterable in accordance with a detection of congested routes for uses as route guidance information by said vehicle, said at least one roadside equipment including;

horizontal and vertical coordinate memory means for storing said route guidance information received from said central control system which is indicative of said congested routes, roadside transmitter means for transmitting roadside identification information indicative of the location of said at least one roadside equipment and for transmitting to said vehicle said route guidance information received from the central traffic control system, said on-board guidance unit including:

on-board receiver means for receiving said identification information and said route guidance information transmitted by said at least one roadside equipment, an on-board system control unit for controlling the reception and storage of said identification information and said route guidance information, on-board memory means for storing in a primary data segment a representation of said at least one primary street in the municipality having an associated plurality of decision points representing crossing streets intersecting said primary street, and for storing in a crossing street data segment said vertical and horizontal coordinate information associated with said decision points along said primary street, at least one bearing representation of a route direction from one of said decision points to a next decision point, a programmed distance representation indicative of the distance between at least two of said decision points, and a representation of a crossing street name, means for altering data contents of said on-board memory means in accordance with said route guidance information transmitted by said at least one roadside equipment, and said on-board system control unit including means for generating guidance instructions in accordance with the data contents of said on-board memory means and for transferring said guidance instructions to a display means for assisting a driver in guiding said vehicle.

19. A vehicle guidance system for guiding a motor vehicle in a municipality wherein locations within said municipality are designated by representations of horizontal and vertical coordinates, said system comprising:

a central traffic control system including;

memory means for storing in a primary data segment a representation of at least one primary street in the municipality having an associated plurality of decision points representing crossing streets intersecting said primary street, and for storing in a crossing street data segment representations of vertical and horizontal coordinate information associated with said decision points along said primary street, means for transmitting a representation of data contents of said memory means wherein said contents are dynamically alterable in accordance with a detection of congested route segments for use as route guidance information by said vehicle, and an on-board guidance unit including:

on-board receiver means for receiving the transmitted dynamically alterable contents of said memory means transmitted by said central traffic control system, an on-board system control unit for controlling the reception and storage of said alterable contents received by said on-board receiver, on-board memory means for storing in a primary data segment a representation of said at least one primary street in the municipality having an associated plurality of decision points representing crossing streets intersecting said primary street, and for storing in a crossing street data segment said vertical and horizontal coordinate information associated with said decision points along said primary street, at least one bearing representation of a route direction from one of said decision points to a next decision point, and a crossing street identification representation for referencing said crossing street in said primary data segment, means connected with said on-board system control unit for altering data contents of said on-board memory means in accordance with said route guidance information transmitted by said central traffic control system, and said on-board system control unit including means for generating guidance instructions in accordance with the data contents of said on-board memory means and for transferring said guidance instructions to a display means for assisting a driver in guiding said vehicle.

* * * * *